US012395873B2

(12) United States Patent
Landis et al.

(10) Patent No.: US 12,395,873 B2
(45) Date of Patent: Aug. 19, 2025

(54) TECHNIQUES FOR REPORTING FREQUENCY CORRECTIONS

(71) Applicant: QUALCOMM Incorporated, San Diego, CA (US)

(72) Inventors: Shay Landis, Hod Hasharon (IL); Guy Wolf, Rosh Haayin (IL); Noam Zach, Kiryat Ono (IL)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/957,216

(22) Filed: Sep. 30, 2022

(65) Prior Publication Data
US 2024/0114365 A1 Apr. 4, 2024

(51) Int. Cl.
*H04W 24/08* (2009.01)
*H04L 5/00* (2006.01)
(Continued)

(52) U.S. Cl.
CPC .......... *H04W 24/08* (2013.01); *H04L 5/0048* (2013.01); *H04L 25/0228* (2013.01); *H04W 24/10* (2013.01)

(58) Field of Classification Search
CPC . H04W 24/08; H04W 24/10; H04W 56/0035; H04L 5/0048; H04L 25/0228;
(Continued)

(56) References Cited

U.S. PATENT DOCUMENTS

2012/0088509 A1* 4/2012 Yi ................ H04W 24/10
455/437
2017/0195016 A1* 7/2017 Alexander ........... H04B 7/0417
(Continued)

FOREIGN PATENT DOCUMENTS

| WO | WO-2021248907 A1 | 12/2021 |
| WO | WO-2021253218 A1 | 12/2021 |
| WO | WO-2022152582 A1 | 7/2022 |

OTHER PUBLICATIONS

International Search Report and Written Opinion—PCT/US2023/032690—ISA/EPO—Jan. 17, 2024.

*Primary Examiner* — Hassan A Phillips
*Assistant Examiner* — Sang C Lee
(74) *Attorney, Agent, or Firm* — Holland & Hart LLP

(57) ABSTRACT

Methods, systems, and devices for wireless communication are described. A user equipment (UE) may receive, from a network entity, a request to report one or more frequency corrections, the request including an indication of one or more reporting parameters for the one or more frequency corrections. The network entity may transmit a set of one or more reference signals associated with performing the one or more frequency corrections at the UE. The UE may monitor for the set of one or more reference signals and transmit, to the network entity, a report indicating the one or more frequency corrections in accordance with the one or more reporting parameters. The UE may transmit the report according to a periodicity, according to a trigger, or both indicated in the one or more reporting parameters. The network entity may perform channel estimations based on the report indicating the one or more frequency corrections.

18 Claims, 15 Drawing Sheets

(51) Int. Cl.
*H04L 25/02* (2006.01)
*H04W 24/10* (2009.01)

(58) Field of Classification Search
CPC ............. H04L 27/2675; H04L 25/0202; H04L 27/2657
See application file for complete search history.

(56) References Cited

U.S. PATENT DOCUMENTS

| | | |
|---|---|---|
| 2018/0205589 A1* | 7/2018 | Bai .................... H04L 27/2672 |
| 2019/0045400 A1* | 2/2019 | Li ........................ H04B 7/0626 |
| 2020/0028640 A1* | 1/2020 | Yeo ...................... H04L 5/0007 |
| 2022/0216912 A1* | 7/2022 | Hu ....................... H04B 7/1855 |
| 2022/0353026 A1* | 11/2022 | Yeo ...................... H04L 5/0007 |

* cited by examiner

TECHNIQUES FOR REPORTING FREQUENCY CORRECTIONS

FIELD OF TECHNOLOGY

The following relates to wireless communications, including techniques for reporting frequency corrections.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UEs). In some wireless communications systems, a network entity, such as one or more components of a base station, may perform channel estimations on a channel.

SUMMARY

The described techniques relate to improved methods, systems, devices, and apparatuses that support techniques for reporting frequency corrections. For example, the described techniques may enable a network entity to perform channel estimations on a channel. For instance, a network entity may use the techniques depicted herein to perform channel estimations on communication channels experiencing flat fading, thereby increasing performance in a flat channel, improving quality of communications, and decreasing latency. For example, the network entity may transmit a request to a user equipment (UE), for the UE to report one or more frequency corrections. The UE may monitor for a set of one or more reference signals associated with performing the one or more frequency corrections at the UE. The UE may transmit, to the network entity, the report indicating the one or more frequency corrections in accordance with one or more reporting parameters. In some examples, the network entity may receive the report via a channel experiencing flat fading. In such examples, the network entity may perform channel estimations on the flat channel based on the reported frequency corrections, thereby enabling the network entity to improve the accuracy of channel estimations in a channel experiencing flat fading.

A method for wireless communication at a UE is described. The method may include receiving, from a network entity, a request to report one or more frequency corrections, the request including an indication of one or more reporting parameters for the one or more frequency corrections, monitoring a set of one or more reference signals associated with performing the one or more frequency corrections at the UE, and transmitting, to the network entity, a report indicating the one or more frequency corrections in accordance with the one or more reporting parameters.

An apparatus for wireless communication at a UE is described. The apparatus may include a processor, memory coupled with the processor, and instructions stored in the memory. The instructions may be executable by the processor to cause the apparatus to receive, from a network entity, a request to report one or more frequency corrections, the request including an indication of one or more reporting parameters for the one or more frequency corrections, monitor a set of one or more reference signals associated with performing the one or more frequency corrections at the UE, and transmit, to the network entity, a report indicating the one or more frequency corrections in accordance with the one or more reporting parameters.

Another apparatus for wireless communication at a UE is described. The apparatus may include means for receiving, from a network entity, a request to report one or more frequency corrections, the request including an indication of one or more reporting parameters for the one or more frequency corrections, means for monitoring a set of one or more reference signals associated with performing the one or more frequency corrections at the UE, and means for transmitting, to the network entity, a report indicating the one or more frequency corrections in accordance with the one or more reporting parameters.

A non-transitory computer-readable medium storing code for wireless communication at a UE is described. The code may include instructions executable by a processor to receive, from a network entity, a request to report one or more frequency corrections, the request including an indication of one or more reporting parameters for the one or more frequency corrections, monitor a set of one or more reference signals associated with performing the one or more frequency corrections at the UE, and transmit, to the network entity, a report indicating the one or more frequency corrections in accordance with the one or more reporting parameters.

Some examples of the method, apparatuses, and non-transitory computer-readable medium described herein may further include operations, features, means, or instructions for transmitting, to the network entity, an indication of a UE capability to report the one or more frequency corrections, where receiving the request to report the one or more frequency corrections may be based on the indication of the UE capability.

Some examples of the method, apparatuses, and non-transitory computer-readable medium described herein may further include operations, features, means, or instructions for monitoring a second set of one or more reference signals after monitoring the set of one or more reference signals and transmitting, to the network entity, a second report indicating a second set of frequency error corrections in accordance with the one or more reporting parameters and the second set of one or more reference signals.

In some examples of the method, apparatuses, and non-transitory computer-readable medium described herein, the report and the second report may be periodic reports. In some examples of the method, apparatuses, and non-transitory computer-readable medium described herein, the one or more reporting parameters indicate a periodicity of transmitting the report indicating the one or more frequency corrections.

In some examples of the method, apparatuses, and non-transitory computer-readable medium described herein, the report and the second report may be aperiodic reports. In some examples of the method, apparatuses, and non-transitory computer-readable medium described herein, the one or more reporting parameters indicate a trigger for transmitting the report indicating the one or more frequency corrections.

In some examples of the method, apparatuses, and non-transitory computer-readable medium described herein, the trigger includes reception of the set of one or more reference signals at the UE. In some examples of the method, apparatuses, and non-transitory computer-readable medium described herein, the set of one or more reference signals includes at least one of a demodulation reference signal (DMRS), a tracking reference signal (TRS), or a combination thereof.

A method for wireless communication at a network entity is described. The method may include transmitting, to a UE, a request to report one or more frequency corrections, the request including an indication of one or more reporting parameters for the one or more frequency corrections, transmitting a set of one or more reference signals associated with performing the one or more frequency corrections at the UE, and receiving, from the UE, a report indicating the one or more frequency corrections in accordance with the one or more reporting parameters.

An apparatus for wireless communication at a network entity is described. The apparatus may include a processor, memory coupled with the processor, and instructions stored in the memory. The instructions may be executable by the processor to cause the apparatus to transmit, to a UE, a request to report one or more frequency corrections, the request including an indication of one or more reporting parameters for the one or more frequency corrections, transmit a set of one or more reference signals associated with performing the one or more frequency corrections at the UE, and receive, from the UE, a report indicating the one or more frequency corrections in accordance with the one or more reporting parameters.

Another apparatus for wireless communication at a network entity is described. The apparatus may include means for transmitting, to a UE, a request to report one or more frequency corrections, the request including an indication of one or more reporting parameters for the one or more frequency corrections, means for transmitting a set of one or more reference signals associated with performing the one or more frequency corrections at the UE, and means for receiving, from the UE, a report indicating the one or more frequency corrections in accordance with the one or more reporting parameters.

A non-transitory computer-readable medium storing code for wireless communication at a network entity is described. The code may include instructions executable by a processor to transmit, to a UE, a request to report one or more frequency corrections, the request including an indication of one or more reporting parameters for the one or more frequency corrections, transmit a set of one or more reference signals associated with performing the one or more frequency corrections at the UE, and receive, from the UE, a report indicating the one or more frequency corrections in accordance with the one or more reporting parameters.

Some examples of the method, apparatuses, and non-transitory computer-readable medium described herein may further include operations, features, means, or instructions for receiving, from the UE, an indication of a UE capability to report the one or more frequency corrections, where transmitting the request to report the one or more frequency corrections may be based on the indication of the UE capability.

Some examples of the method, apparatuses, and non-transitory computer-readable medium described herein may further include operations, features, means, or instructions for transmitting a second set of one or more reference signals after transmitting the set of one or more reference signals and receiving, from the UE, a second report indicating the second set of frequency error corrections in accordance with the one or more reporting parameters and the second set of one or more reference signals.

Some examples of the method, apparatuses, and non-transitory computer-readable medium described herein may further include operations, features, means, or instructions for performing a channel estimation for the UE based on the report indicating the one or more frequency corrections and the second report indicating the second set of frequency error corrections.

In some examples of the method, apparatuses, and non-transitory computer-readable medium described herein, the report and the second report may be periodic reports. In some examples of the method, apparatuses, and non-transitory computer-readable medium described herein, the one or more reporting parameters indicate a periodicity of transmitting the report indicating the one or more frequency corrections.

In some examples of the method, apparatuses, and non-transitory computer-readable medium described herein, the report and the second report may be aperiodic reports. In some examples of the method, apparatuses, and non-transitory computer-readable medium described herein, the one or more reporting parameters indicate a trigger for transmitting the report indicating the one or more frequency corrections.

In some examples of the method, apparatuses, and non-transitory computer-readable medium described herein, the trigger includes reception of the set of one or more reference signals at the UE. In some examples of the method, apparatuses, and non-transitory computer-readable medium described herein, the set of one or more reference signals includes at least one of a DMRS, a TRS, or a combination thereof.

DETAILED DESCRIPTION

Figure 1:
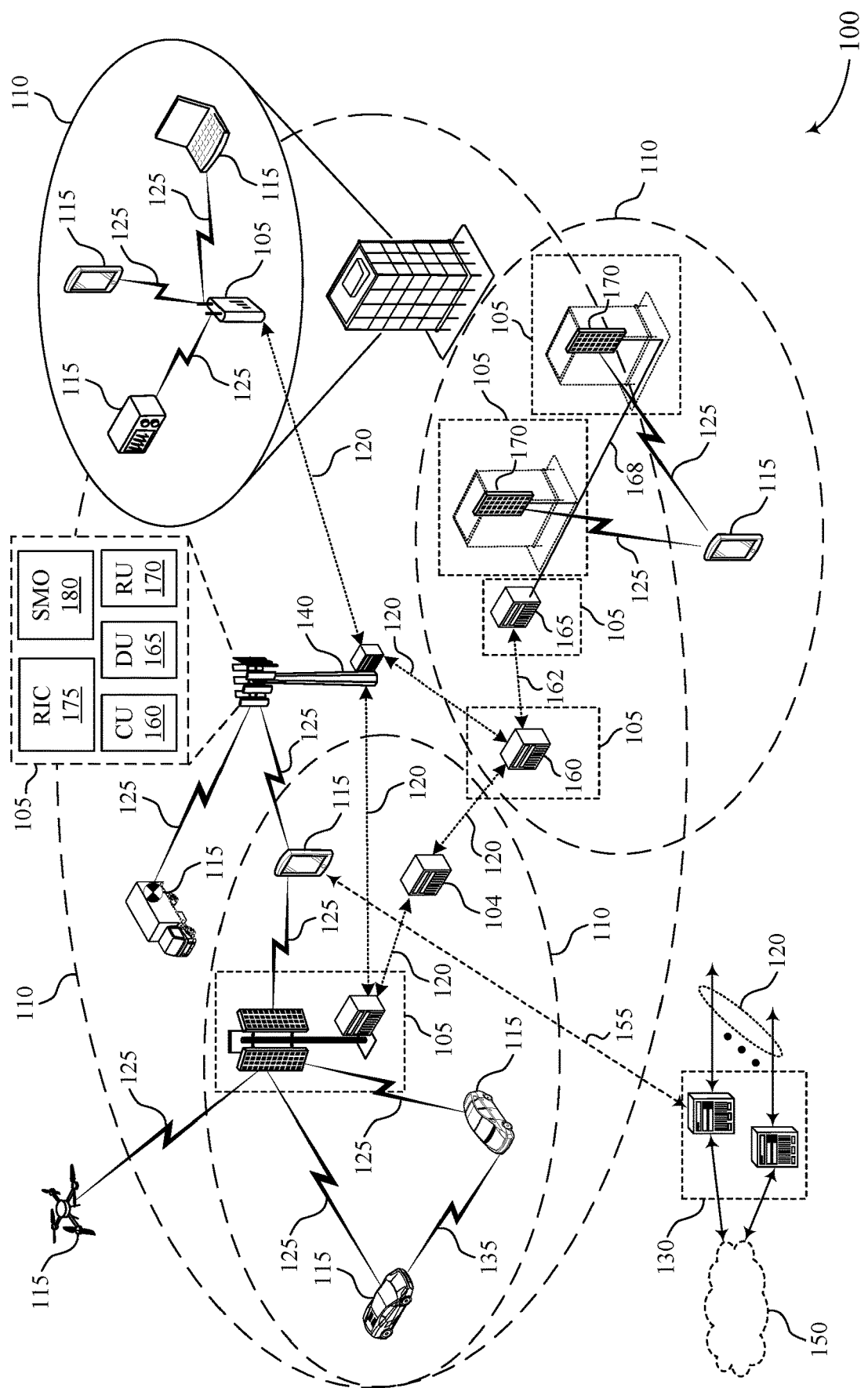
FIG. 1 illustrates an example of a wireless communications system that supports techniques for reporting frequency corrections in accordance with one or more aspects of the present disclosure.

In some wireless communications systems, a network entity may communicate with a user equipment (UE) via one or more channels. In such systems, the network entity may perform channel estimations based on uplink signaling received from the UE, while the UE may perform channel estimations based on downlink signaling received from the network entity. In some cases, the network entity may receive uplink signaling from the UE in a channel that experiences flat fading. A channel may experience flat fading as a result of a frequency allocation for the channel being smaller than a coherent bandwidth (e.g., a measurement of the range of frequencies over which the channel is constant or flat) of the channel. In such cases, each frequency component (e.g., of a signal) transmitted in the channel may experience the same amplitude and phase fading. Additionally, the channel may experience flat fading in line-of-sight (LOS) communications (e.g., where the coherent bandwidth may be infinite, rendering the frequency allocation smaller than the coherent bandwidth).

In cases of flat fading, the network entity may not be able to accurately perform channel estimations on the received uplink signaling. For example, the network entity may receive uplink signaling that includes multiple demodulation reference signals (DMRSs). As part of channel estimations, the network entity may determine whether the frequency components of the channel are experiencing a Doppler spread or a Doppler shift based on measuring the correlation of two or more DMRSs received in different symbols in the uplink signaling. However, if the network entity receives the uplink signaling via a flat channel (e.g., a channel experiencing flat fading) the network entity may not be able to determine whether the flat channel is experiencing a Doppler shift or the Doppler spread, thereby increasing the error when performing channel estimations. Increased errors in channel estimations may lead to increased latency, poor channel quality, and decreased user experience.

The techniques described herein may enable a network entity to increase the accuracy for performing channel estimations. For example, the UE may receive, from the network entity, a request to report frequency corrections (e.g., frequency error corrections) performed during channel estimation. The UE may monitor for one or more reference signals (e.g., DMRSs, tracking reference signals (TRSs), or both) in downlink signaling from the network entity. To receive the one or more reference signals from the network entity, the UE may perform frequency corrections (e.g., adjust one or more timing or frequency parameters at the UE). Based on the time and frequency corrections used to receive the reference signals, the UE may adjust one or more frequency or time parameters for transmitting uplink signaling. In addition to transmitting the uplink signaling, the UE may transmit a report indicating the frequency corrections to the network entity. In some cases, the network entity may receive the uplink signaling via a flat channel. In such cases, the network entity may use the received frequency corrections to perform the channel estimations. Thus, based on received frequency corrections, the network entity may estimate the flat channel, thereby reducing the channel estimation errors, decreasing latency, and improving channel quality.

Aspects of the disclosure are initially described in the context of wireless communications systems. Aspects of the disclosure are illustrated in the context of a process flow. Aspects of the disclosure are further illustrated by and described with reference to apparatus diagrams, system diagrams, and flowcharts that relate to techniques for reporting frequency corrections.

FIG. 1 illustrates an example of a wireless communications system 100 that supports techniques for reporting frequency corrections in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for reporting frequency corrections as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of the wireless communications system 100, the network entity 105 may communicate with the UE 115 via one or more channels. In such cases, the network entity 105 may communicate with the UE 115 via a channel that may experience flat fading (e.g., a flat channel or an almost flat channel), such that signals transmitted via the flat channel may experience the same amplitude and phase fading. A flat channel may occur due to the frequency allocation for the channel being smaller than the coherent bandwidth of the channel. Additionally, the flat channel may be due to LOS communications, where the coherent bandwidth is infinite, rendering the frequency allocation smaller than the coherent bandwidth.

In some cases, the network entity 105 may estimate channel statistics, such as delay spread, Doppler spread, and signal-to-noise ratio (SNR) based on one or more signals (e.g., DMRSs or TRSs) transmitted from the UE 115. For example, the network entity 105 may estimate the Doppler spread of a channel based on measuring the empirical correlation between two or more DMRSs in different orthogonal frequency division multiplexed (OFDM) symbols of the uplink channel (e.g., physical uplink shared channel (PUSCH)). However, if the network entity 105 receives the DMRSs via a flat channel, the network entity 105 may not be able to estimate the Doppler spread correctly (e.g., due to a lack of statistics between the DMRSs). For example, if the amplitude and phase of the frequency components vary in the channel (e.g., non-flat channel), the network entity 105 may be able to estimate the Doppler spread due to differences in the DMRSs received in various OFDM symbols. But, in cases of a flat channel, the network entity 105 may not be able to estimate the Doppler spread due to similar amplitude and phase fading over the channel. Further, in some cases of flat channels, the phase of the DMRSs may change between OFDM symbols. In such cases, the network entity 105 or the UE 115 may not be able to distinguish whether the phase difference between DMRSs is due to flat fading of the channel or due to a Doppler shift of a LOS channel. Therefore, when communicating on a flat channel, the network entity 105 may not be able to determine whether there is a Doppler shift or Doppler spread occurring in the channel, thereby introducing errors in channel estimations, increasing latency, and degrading user experience.

In order for the network entity 105 to determine the cause of a flat channel and improve accuracy in channel estimations, the network entity 105 may request a frequency correction report from the UE 115 to assist in channel estimation of a flat channel. For example, the UE 115 may receive from the network entity 105, a request to report frequency corrections implemented at the UE 115. For example, the UE 115 may monitor for one or more DMRSs, TRSs, or both. To receive the DMRSs or TRSs, the UE 115 may perform frequency corrections (e.g., adjust one or more timing and frequency parameters at the UE 115). The UE 115 may perform the frequency corrections prior to transmitting uplink signaling to the network entity 105. In some instances, the uplink signaling may be based on the frequency corrections made to receive the DMRSs or TRSs. Additionally, the UE 115 may transmit a report indicating the frequency corrections to the network entity 105. In some examples, the network entity 105 may receive the uplink signaling via a flat channel. In such cases, the network entity 105 may use the received frequency corrections to perform the channel estimations on the flat channel, thereby improving performance when encountering a flat channel (e.g., when the frequency allocation of a channel is smaller than the coherent bandwidth of the channel), increasing channel estimation accuracy, and improving user experience.

Figure 2:
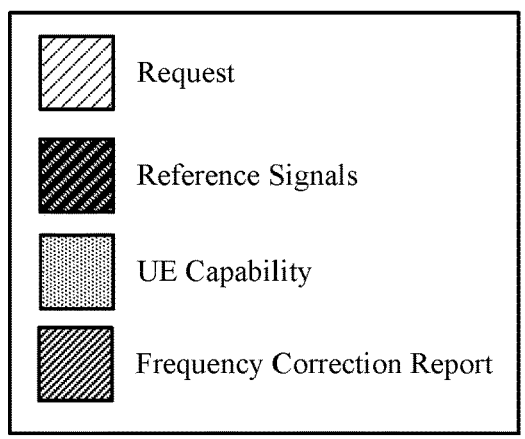
FIG. 2 illustrates an example of a wireless communications system that supports techniques for reporting frequency corrections in accordance with one or more aspects of the present disclosure.
Figure 2:
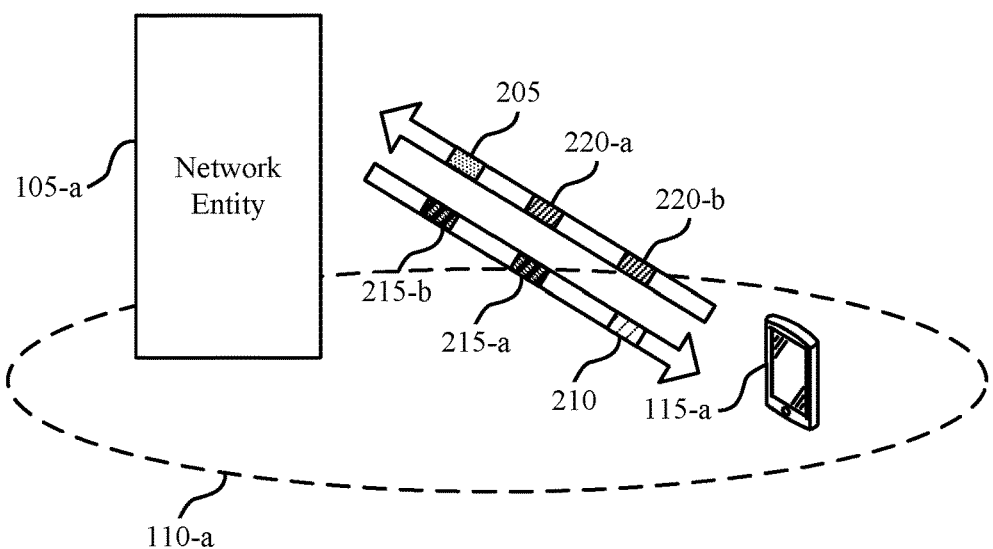

FIG. 2 illustrates an example of a wireless communications system 200 that supports techniques for reporting frequency corrections in accordance with one or more aspects of the present disclosure. The wireless communications system 200 may implement or be implemented by aspects of wireless communications system 100 as described with reference to FIG. 1. For example, the wireless communications system 200 may include a UE 115-a and a network entity 105-a, which may be examples of the UE 115 and the network entity 105 as described herein with reference to FIG. 1. The UE 115-a and the network entity 105-a may operate within a coverage area 110-a, which may be an example of a coverage area 110.

In some cases, the UE 115-a may monitor for reference signals 215 from the network entity 105-a. The reference signals 215 may include DMRSs, TRSs, or a combination thereof. In such cases, to successfully decode the reference signals 215, the UE 115 may perform one or more frequency corrections (e.g., by adjusting the crystal or internal clock of the receiving chain at the UE 115-a). For example, the UE 115-a may continuously estimate timing and frequency errors of a channel between the UE 115-*a* and the network entity 105-*a* based on the reference signals 215 (e.g., based on decoding the TRS and DMRSs received in a physical downlink shared channel (PDSCH)). Frequency errors of a channel may be caused by channel conditions, while timing errors may be caused by errors in the oscillating (XO) crystal (e.g., internal clocks) of the UE 115-*a*. In some cases, the frequency changes due to channel conditions may be caused by a Doppler spread or a Doppler Shift. The Doppler shift may be a frequency change of the channel from a single source (e.g., single reflector), which results in slow changes to the frequency trend of a channel. The Doppler spread may be a combination of frequency changes of a channel due to one or more Doppler shifts from many reflectors having different speeds (e.g., objects in the path of communication between the network entity 105-*a* and the UE 115-*a*). In case of a Doppler spread, the frequency may vary in time relatively quickly even if the physical speed of the UE 115-*a* remains unchanged. For example, an increased amount of reflectors in the communication channel between the UE 115-*a* and the network entity 105-*a* may cause multiple Doppler shifts (e.g., all with varying speeds) in channel. Thus, the Doppler spread of a channel may refer to one or more Doppler shifts, all with varying rates of change, occurring in the channel.

In some cases, the network entity 105-*a* and the UE 115-*a* may communicate via a flat channel. For example, the UE 115-*a* may transmit one or more uplink signals via a channel where the frequency allocation for the channel is smaller than the coherent bandwidth of the channel. In such examples, the network entity 105-*a* may receive the one or more uplink signals via the flat channel (e.g., the network entity encounters a flat channel). The network entity 105-*a* may attempt to estimate the time correlation of the channel (e.g., the Doppler spread) empirically on two or more DMRSs of the channel (e.g., physical uplink shared channel) using Equation 1:

$$p_k = \frac{\sum_{i=0}^{P-1} p_i * p_{i+k}}{\sqrt{\sum_{i=0}^{P-k}|p_i|^2 \sum_{i=k}^{P}|p_i|^2 - \sigma^2}} \quad (1)$$

where k represents the time index offset between the DMRSs, $p_i$ represents the samples from the first DMRS in resource element i, and $p_{i+k}$ represents the samples from the second DMRS at resource element i.

However, in cases of flat fading (e.g., when the network entity 105-*a* encounters a flat channel), the network entity 105-*a* may not be able to estimate the time correlation accurately, as there may be no statistics due to variations in the DMRSs in a flat channel. For example, in a flat channel, the amplitude and phase fading of a signal may be similar across frequency components. In turn, the time correlation between DMRSs across multiple symbols may be similar. Thus, in cases of a flat channel, the estimation using Equation 1 may result in a value of '1' which may not represent the actual Doppler spread of the channel. Without accurate time correlation estimation, the network entity 105-*a* may not be able to perform channel estimations accurately, resulting in decreased channel quality, increased latency, and poor user experience.

In some implementations of the wireless communications system 200, in order to increase the accuracy of channel estimations of a flat channel, the network entity 105-*a* may request a report of frequency corrections from the UE 115-*a*. For example, the UE 115-*a* may transmit a UE capability message 205 indicating that the UE 115-*a* is capable of transmitting indication of frequency corrections to the network entity 105-*a*. The UE capability message 205 may be included in uplink control information (UCI), a MAC control element (MAC-CE), RRC messaging, or a combination thereof. Based on receiving the UE capability message 205, the network entity 105-*a* may transmit a request message 210 requesting transmission of a frequency correction report 220. The request message 210 may be included in downlink control information (DCI), RRC messaging, or a combination thereof. In some examples, the request message 210 may include one or more reporting parameters associated with reporting the frequency corrections.

For example, the one or more reporting parameters may include a periodicity at which the UE 115-*a* is to report the frequency corrections (e.g., transmit the frequency correction report 220), a trigger for transmitting the frequency correction report 220 (e.g., aperiodic frequency correction report), or both. In some implementations, the reporting parameters may include a threshold value configured by the network entity 105-*a*, at which if the frequency corrections satisfy the threshold value, the UE 115-*a* may transmit the frequency correction report 220. Additionally, the network entity 105-*a* may indicate to the UE 115-*a* which DMRS or TRS (e.g., for example the last TRS or DMRS) to use when reporting the frequency corrections. For instance, the network entity 105-*a* may indicate that the UE 115-*a* is to report the frequency corrections associated with decoding the last (most recent) DMRS or TRS.

The network entity 105-*a* may transmit reference signals 215-*a*, which may include one or more DMRSs, one or more TRSs, or a both, to the UE 115-*a* via a downlink channel (e.g., PDSCH). The UE 115-*a* may monitor for the reference signals 215-*a* and decode the reference signals 215-*a* using one or more frequency corrections. In response to the request message 210, the UE 115-*a* may transmit uplink signaling to the network entity 105-*a* in accordance with the one or more frequency corrections (e.g., by applying the same or similar frequency corrections to decode the DMRSs for transmission at the UE 115-*a*). In addition to transmitting the uplink signaling, the UE 115-*a* may transmit the frequency correction report 220-*a* indicating the one or more frequency corrections to the network entity 105-*a* via a PUSCH. The frequency correction report 220 may be included in UCI, MAC-CE, RRC messaging, as a payload of a PUSCH, or a combination thereof. The network entity 105-*a* may perform channel estimations using the frequency corrections received in the frequency correction report 220-*a*.

In some examples, the network entity 105-*a* may compare the frequency corrections received in the frequency correction report 220-*a* with frequency corrections performed by the network entity 105-*a*. If the frequency corrections of the UE 115-*a* have a relatively low correlation with those of the network entity 105-*a*, the network entity 105-*a* may determine that the channel is experiencing flat fading due to a Doppler spread (e.g., the frequencies of the channel are varying quickly at the UE 115-*a*) and may assume a low time correlation between the time at the UE 115-*a* and the time at the network entity 105-*a* for performing channel estimations. Alternatively, if the frequency corrections of the UE 115-*a* have a relatively high correlation with those of the network entity 105-*a*, the network entity 105-*a* may determine that the channel is experiencing flat fading due to a Doppler shift (e.g., the frequencies of the channel are varying slowly at the UE 115-*a*) and assume a relatively high time correlation between the UE 115-*a* and the network entity 105-*a* for performing channel estimates.

Further, the UE 115-*a* may transmit a frequency correction report 220-*b* according to one or more operational parameters (e.g., operational parameters indicated by the network entity 105-*a*). For example, the UE 115-*a* may receive reference signals 215-*b* and decode the reference signals 215-*b* using one or more frequency corrections. In such examples, the UE 115-*a* may transmit the frequency correction report 220-*b* to the network entity 105-*a*. In some examples, the one or more operational parameters may indicate the periodicity at which the UE 115-*a* is to transmit the frequency correction report 220-*b*. In some examples, the one or more operational parameters may indicate the trigger at which the UE 115-*a* is to transmit the frequency correction report. In such examples, the trigger may be based on the UE 115-*a* receiving the reference signals 215-*b* or one of the reference signals 215-*b*. For example, based on receiving the reference signals 215-*b*, the UE 115-*a* may decode the reference signals 215-*b* using frequency corrections and transmit the frequency correction report 220-*b* to the network entity 105-*a*. In some examples, the UE 115-*a* may receive the reference signals 215-*b* and decode the reference signals 215-*b* using frequency corrections. In such examples, the UE 115-*a* may determine that the frequency corrections used to decode the reference signals 215-*b* satisfy the indicated frequency threshold. The UE 115-*b* may transmit the frequency correction report 220-*b* based on the frequency corrections satisfying the frequency threshold. The network entity 105-*a* may receive the frequency correction report 220-*b* via a PUSCH experiencing flat fading. The network entity 105-*a* may use the indicated frequency corrections to perform channel estimations, thereby improving communication quality in channels that experience flat fading.

Figure 3:
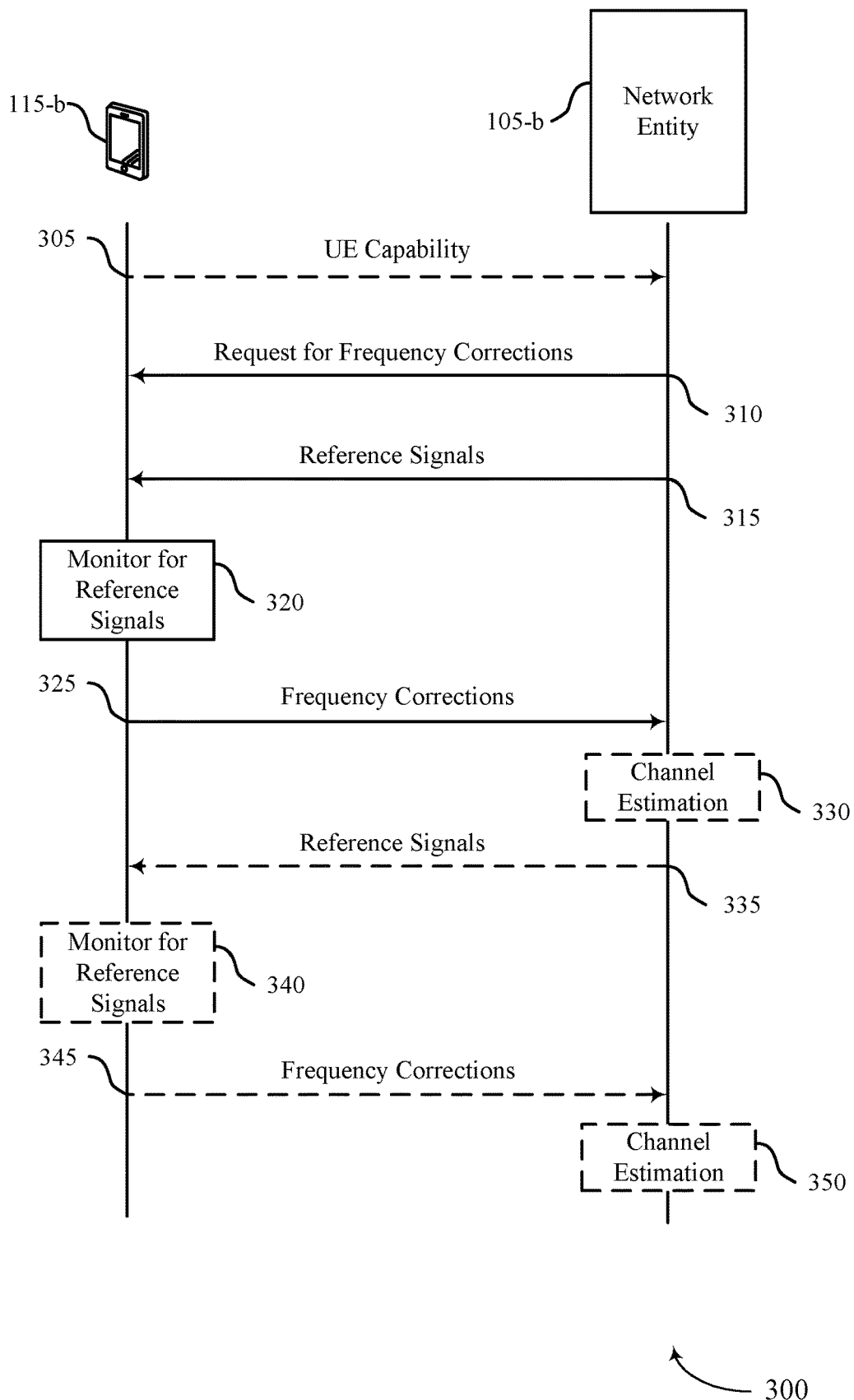
FIG. 3 illustrates an example of a process flow that supports techniques for reporting frequency corrections in accordance with one or more aspects of the present disclosure.

FIG. 3 illustrates an example of a process flow 300 that supports techniques for reporting frequency corrections in accordance with one or more aspects of the present disclosure. The process flow 300 may implement or be implemented by aspects of wireless communications system 100 and the wireless communications system 200 with reference to FIGS. 1 and 2. For example, the process flow 300 may include a UE 115-*b* and a network entity 105-*b*, which may be examples of corresponding devices as described herein with reference to FIGS. 1 and 2. In the following description of the process flow 300, the operations may be performed in a different order than the order shown. Specific operations also may be left out of the process flow 300, or other operations may be added to the process flow 300. Further, although some operations or signaling may be shown to occur at different times for discussion purposes, these operations may actually occur at the same time.

At 305, the UE 115-*b* may optionally transmit to the network entity 105-*b*, an indication of a UE capability to report one or more frequency corrections. The indication of a UE capability may be an example of a UE capability message 205 as described herein with reference to FIG. 2.

At 310, the UE 115-*b* may receive, and the network entity 105-*b* transmit, a request to report the one or more frequency corrections. The request may include an indication of one or more reporting parameters for the one or more frequency corrections. The one or more reporting parameters may indicate a periodicity of transmitting the report of the one or more frequency corrections. Additionally, the one or more reporting parameters may indicate a trigger for transmitting the report, where the trigger includes reception of one or more reference signals at the UE 115-*b*. In some examples, the one or more reporting parameters may include a threshold value, such that if the frequency corrections at the UE 115-*b* are greater than the indicated threshold value, the UE 115-*b* may transmit the report the one or more frequency corrections.

At 315, the network entity 105-*b* may transmit a set of one or more reference signals associated with performing the one or more frequency corrections. The set of one or more reference signals may include at least one of a DMRS, a TRS, or a combination thereof. At 320, the UE 115-*b* may monitor for the set of one or more reference signals. For example, to monitor and decode the set of one or more reference signals, the UE 115-*b* may perform the one or more frequency corrections.

At 325, the UE 115-*b* may transmit, the network entity 105-*b*, the report indicating the one or more frequency corrections in accordance with the one or more reporting parameters. For example, the UE 115-*b* may transmit the report (e.g., a periodic report) according to the periodicity indicated in the reporting parameters. In some examples, the UE 115-*b* may transmit the report (e.g., aperiodic report) based on receiving the one or more reference signals according to the trigger indicated in the one or more reporting parameters. In some examples, the UE 115-*b* may determine that the one or more frequency corrections satisfy the indicated threshold value, where the report is transmitted based on the one or more frequency correction satisfying the indicated threshold value.

At 330, the network entity 105-*b*, may optionally perform channel estimations based on the report indicating the one or more frequency corrections. For example, the network entity 105-*b* may receive the report in a channel experiencing flat fading. In such examples, the network entity 105-*b* may determine whether a Doppler shift or a Doppler spread is affecting the channel and estimate the channel based on the one or more frequency corrections.

At 335, the network entity 105-*b*, may optionally transmit a second set of one or more reference signals after transmitting the set of one or more reference signals. At 340, the UE 115-*b*, may optionally monitor the second set of one or more reference signals, and decode the second set of one or more reference signals using a second set of frequency error corrections.

At 345, the UE 115-*b*, may optionally transmit a second report indicating the second set of frequency error corrections in accordance with the one or more reporting parameters and the second set of one or more reference signals. At 350, the network entity 105-*b*, may optionally perform channel estimations based on the report indicating the one or more frequency corrections and the second report indicating the second set of frequency error corrections.

Figure 4:
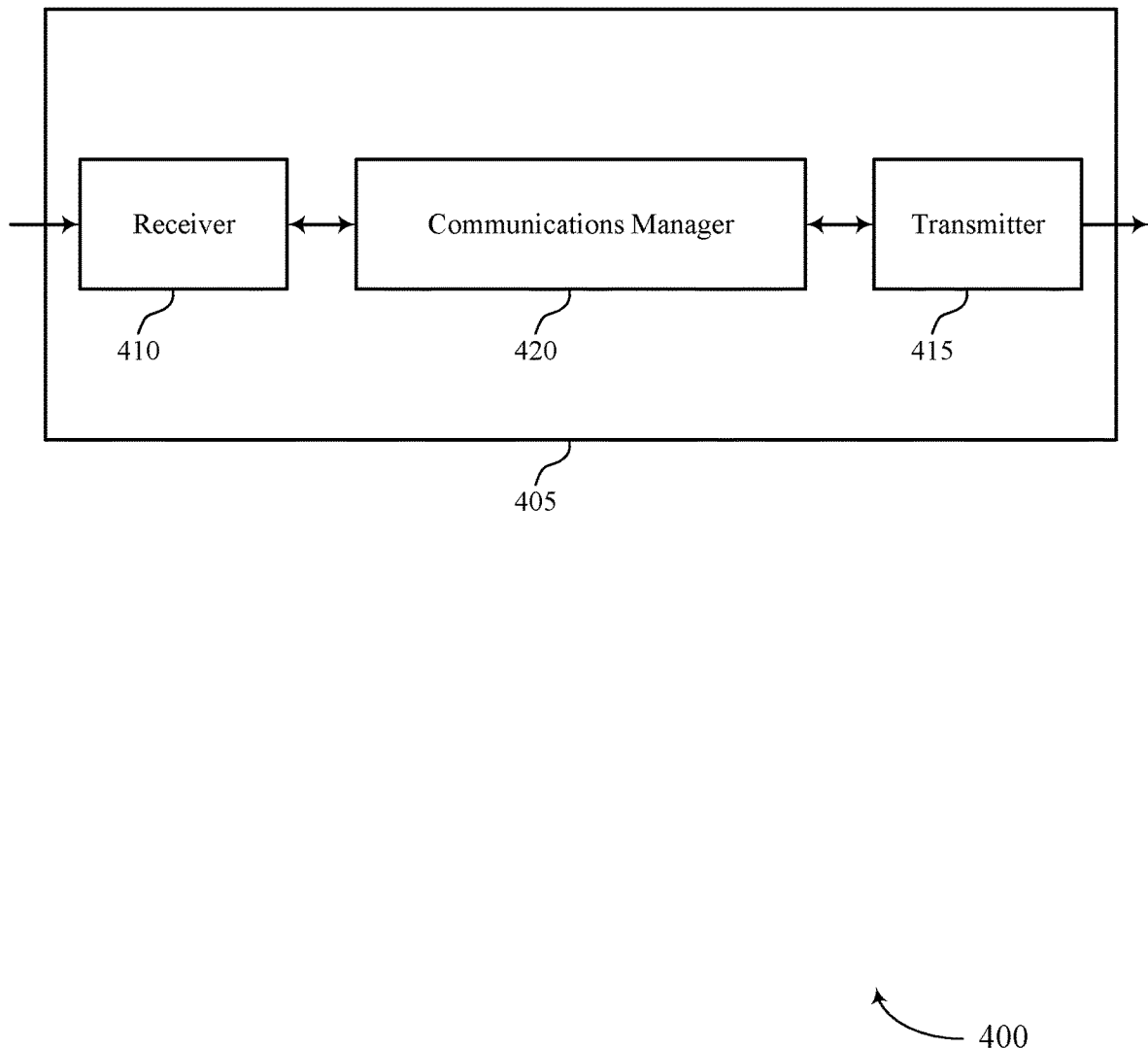
FIGS. 4 and 5 illustrate block diagrams of devices that support techniques for reporting frequency corrections in accordance with one or more aspects of the present disclosure.

FIG. 4 illustrates a block diagram 400 of a device 405 that supports techniques for reporting frequency corrections in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for reporting frequency corrections). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for reporting frequency corrections). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for reporting frequency corrections as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for receiving, from a network entity, a request to report one or more frequency corrections, the request including an indication of one or more reporting parameters for the one or more frequency corrections. The communications manager 420 may be configured as or otherwise support a means for monitoring a set of one or more reference signals associated with performing the one or more frequency corrections at the UE. The communications manager 420 may be configured as or otherwise support a means for transmitting, to the network entity, a report indicating the one or more frequency corrections in accordance with the one or more reporting parameters.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for a network entity to use frequency error corrections in channel estimation, which may provide for more efficient utilization of communication resources.

Figure 5:
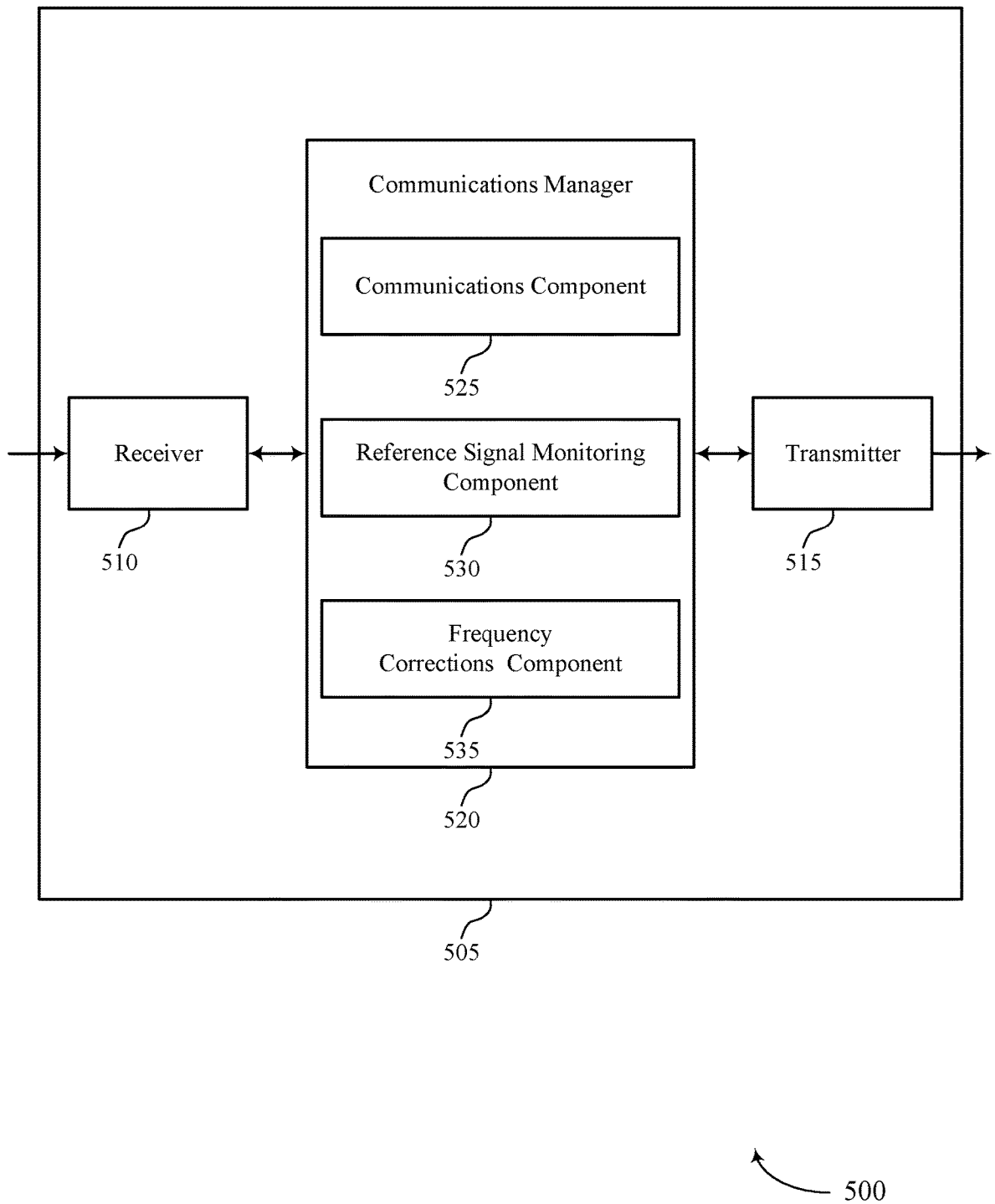

FIG. 5 illustrates a block diagram 500 of a device 505 that supports techniques for reporting frequency corrections in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for reporting frequency corrections). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for reporting frequency corrections). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for reporting frequency corrections as described herein. For example, the communications manager 520 may include a communications component 525, a reference signal monitoring component 530, a frequency corrections component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The communications component 525 may be configured as or otherwise support a means for receiving, from a network entity, a request to report one or more frequency corrections, the request including an indication of one or more reporting parameters for the one or more frequency corrections. The reference signal monitoring component 530 may be configured as or otherwise support a means for monitoring a set of one or more reference signals associated with performing the one or more frequency corrections at the UE. The frequency corrections component 535 may be configured as or otherwise support a means for transmitting, to the network entity, a report indicating the one or more frequency corrections in accordance with the one or more reporting parameters.

Figure 6:
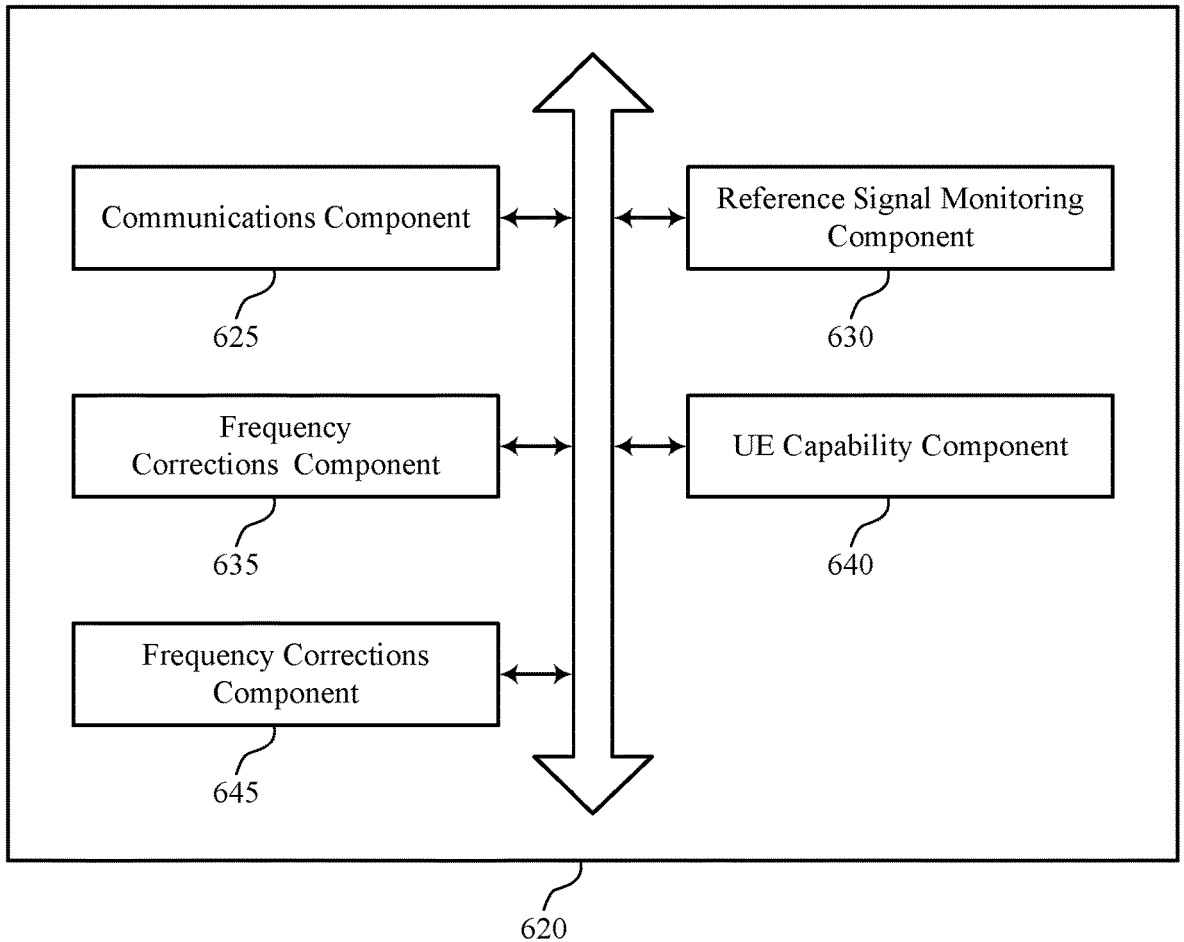
FIG. 6 illustrates a block diagram of a communications manager that supports techniques for reporting frequency corrections in accordance with one or more aspects of the present disclosure.

FIG. 6 illustrates a block diagram 600 of a communications manager 620 that supports techniques for reporting frequency corrections in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for reporting frequency corrections as described herein. For example, the communications manager 620 may include a communications component 625, a reference signal monitoring component 630, a frequency corrections component 635, a UE capability component 640, a frequency corrections component 645, or any combination thereof. Each of these components may communicate, directly or indirectly, with one another (e.g., via one or more buses).

The communications manager 620 may support wireless communication at a UE in accordance with examples as disclosed herein. The communications component 625 may be configured as or otherwise support a means for receiving, from a network entity, a request to report one or more frequency corrections, the request including an indication of one or more reporting parameters for the one or more frequency corrections. The reference signal monitoring component 630 may be configured as or otherwise support a means for monitoring a set of one or more reference signals associated with performing the one or more frequency corrections at the UE. The frequency corrections component 635 may be configured as or otherwise support a means for transmitting, to the network entity, a report indicating the one or more frequency corrections in accordance with the one or more reporting parameters.

In some examples, the UE capability component 640 may be configured as or otherwise support a means for transmitting, to the network entity, an indication of a UE capability to report the one or more frequency corrections, where receiving the request to report the one or more frequency corrections is based on the indication of the UE capability.

In some examples, the reference signal monitoring component 630 may be configured as or otherwise support a means for monitoring a second set of one or more reference signals after monitoring the set of one or more reference signals. In some examples, the frequency corrections component 645 may be configured as or otherwise support a means for transmitting, to the network entity, a second report indicating a second set of frequency error corrections in accordance with the one or more reporting parameters and the second set of one or more reference signals.

In some examples, the report and the second report are periodic reports. In some examples, the one or more reporting parameters indicate a periodicity of transmitting the report indicating the one or more frequency corrections. In some examples, the report and the second report are aperiodic reports.

In some examples, the one or more reporting parameters indicate a trigger for transmitting the report indicating the one or more frequency corrections. In some examples, the trigger includes reception of the set of one or more reference signals at the UE. In some examples, the set of one or more reference signals includes at least one of a DMRS, a TRS, or a combination thereof.

Figure 7:
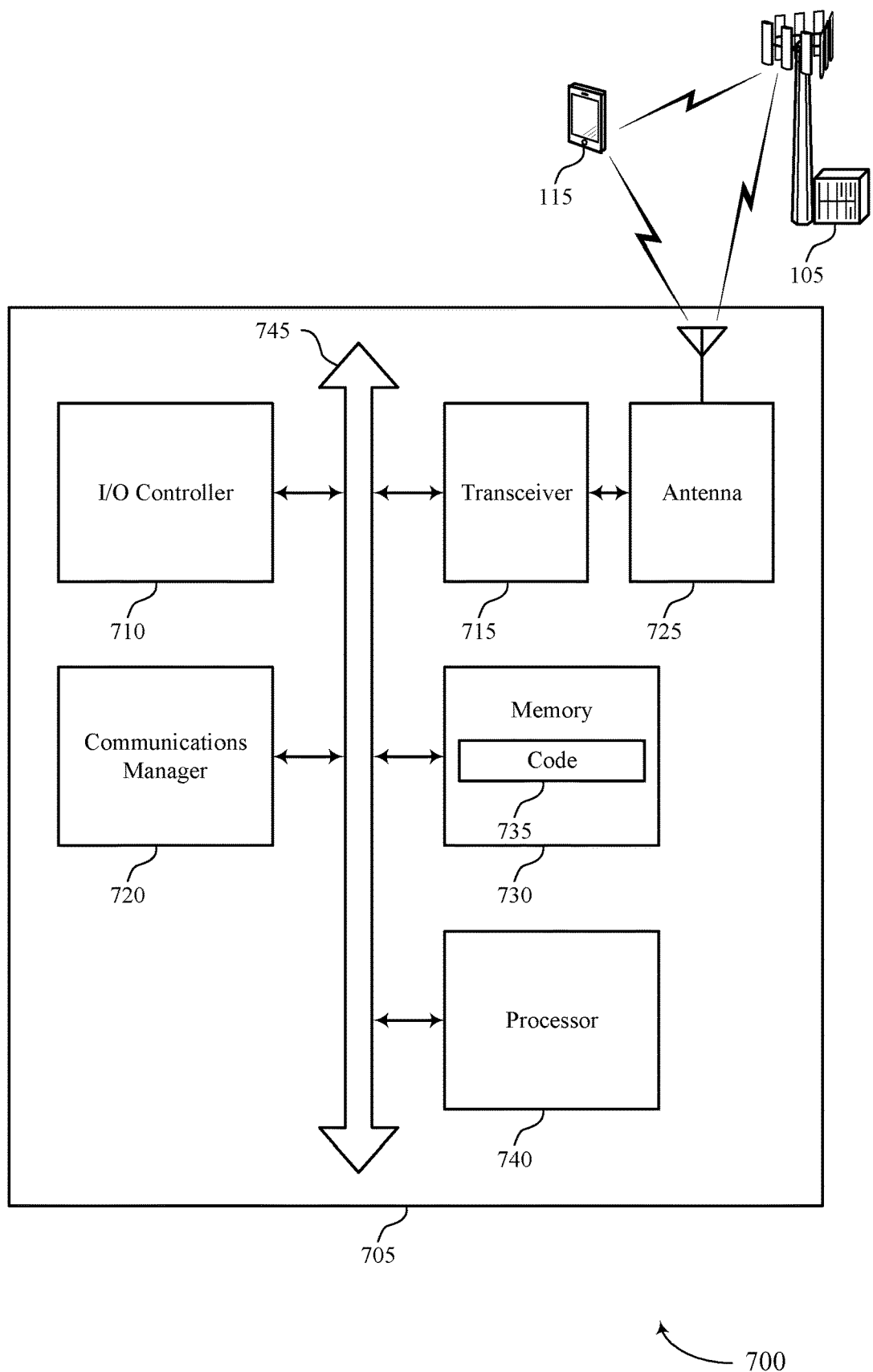
FIG. 7 illustrates a diagram of a system including a device that supports techniques for reporting frequency corrections in accordance with one or more aspects of the present disclosure.

FIG. 7 illustrates a diagram of a system 700 including a device 705 that supports techniques for reporting frequency corrections in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for reporting frequency corrections). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a network entity, a request to report one or more frequency corrections, the request including an indication of one or more reporting parameters for the one or more frequency corrections. The communications manager 720 may be configured as or otherwise support a means for monitoring a set of one or more reference signals associated with performing the one or more frequency corrections at the UE. The communications manager 720 may be configured as or otherwise support a means for transmitting, to the network entity, a report indicating the one or more frequency corrections in accordance with the one or more reporting parameters.

By including or configuring the communications manager 720 in accordance with examples as described herein, the device 705 may support techniques for a network entity to use frequency error corrections in channel estimation, which may provide for improved communication reliability, reduced latency, and improved user experience related to reduced processing, reduced power consumption.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for reporting frequency corrections as described herein, or the processor 740 and the memory 730 may be otherwise configured to perform or support such operations.

Figure 8:
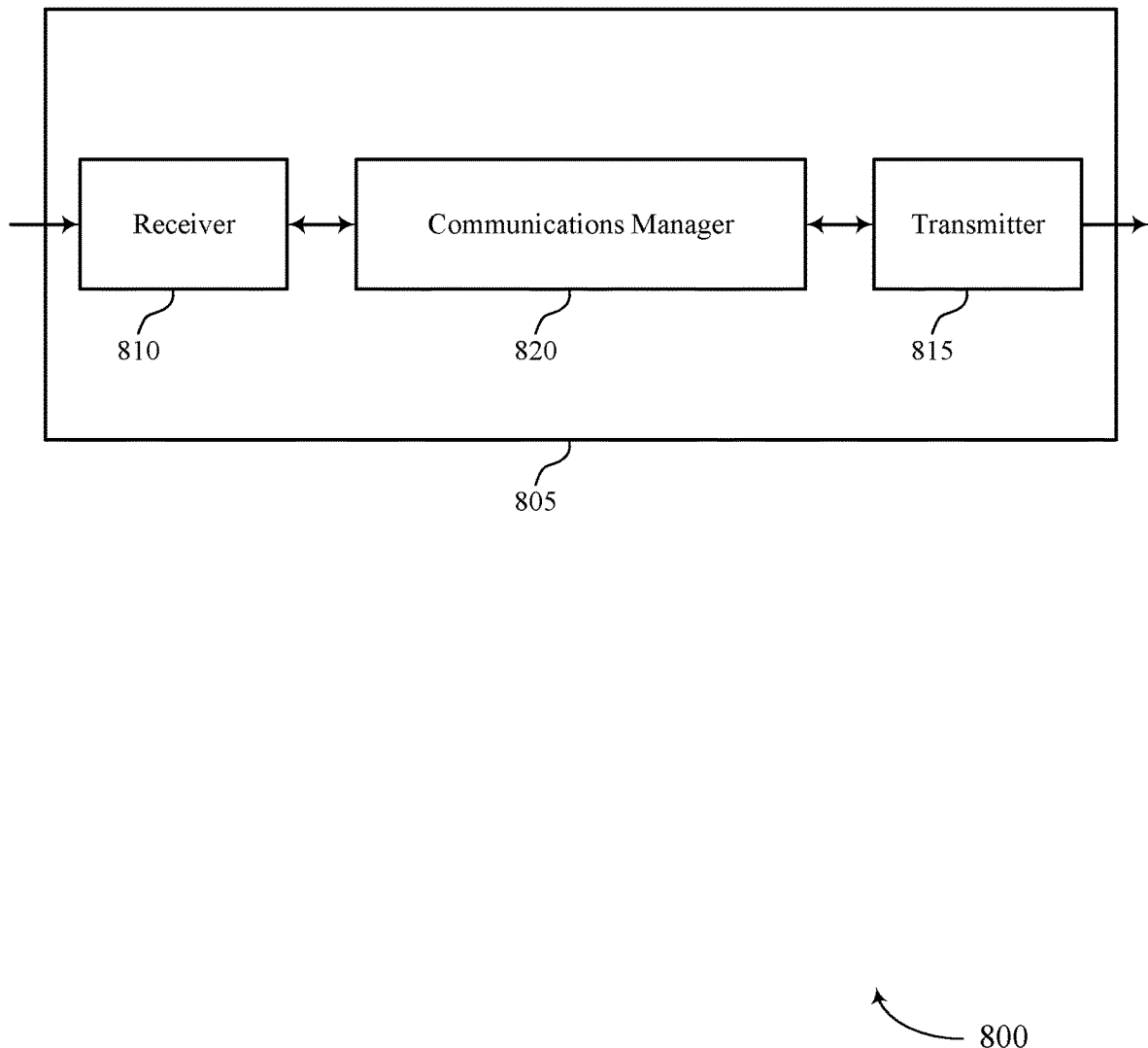
FIGS. 8 and 9 illustrate block diagrams of devices that support techniques for reporting frequency corrections in accordance with one or more aspects of the present disclosure.

FIG. 8 illustrates a block diagram 800 of a device 805 that supports techniques for reporting frequency corrections in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for reporting frequency corrections as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting, to a UE, a request to report one or more frequency corrections, the request including an indication of one or more reporting parameters for the one or more frequency corrections. The communications manager 820 may be configured as or otherwise support a means for transmitting a set of one or more reference signals associated with performing the one or more frequency corrections at the UE. The communications manager 820 may be configured as or otherwise support a means for receiving, from the UE, a report indicating the one or more frequency corrections in accordance with the one or more reporting parameters.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for a network entity to use frequency error corrections in channel estimation, which may provide for more efficient utilization of communication resources.

Figure 9:
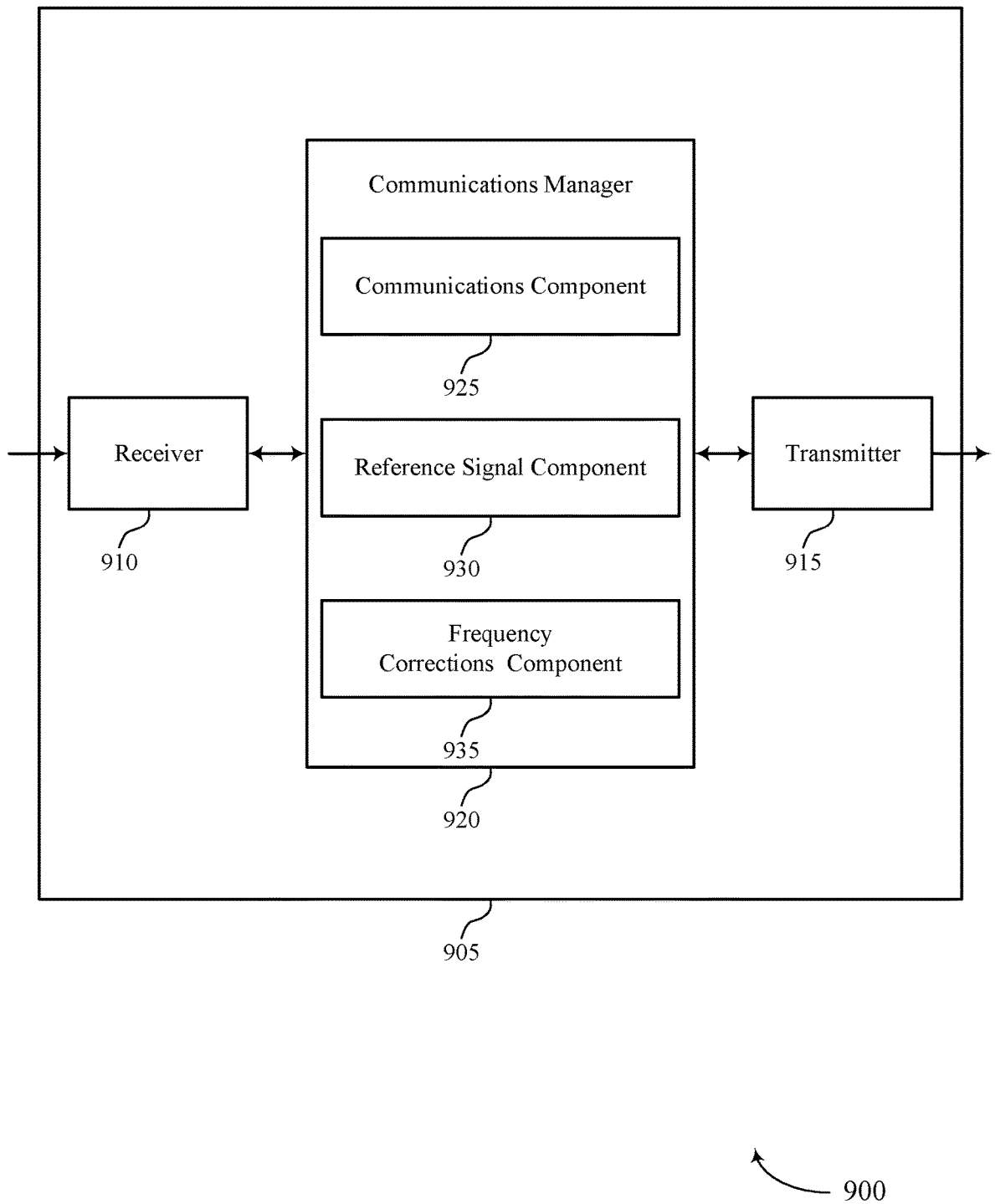

FIG. 9 illustrates a block diagram 900 of a device 905 that supports techniques for reporting frequency corrections in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for reporting frequency corrections as described herein. For example, the communications manager 920 may include a communications component 925, a reference signal component 930, a frequency corrections component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The communications component 925 may be configured as or otherwise support a means for transmitting, to a UE, a request to report one or more frequency corrections, the request including an indication of one or more reporting parameters for the one or more frequency corrections. The reference signal component 930 may be configured as or otherwise support a means for transmitting a set of one or more reference signals associated with performing the one or more frequency corrections at the UE. The frequency corrections component 935 may be configured as or otherwise support a means for receiving, from the UE, a report indicating the one or more frequency corrections in accordance with the one or more reporting parameters.

Figure 10:
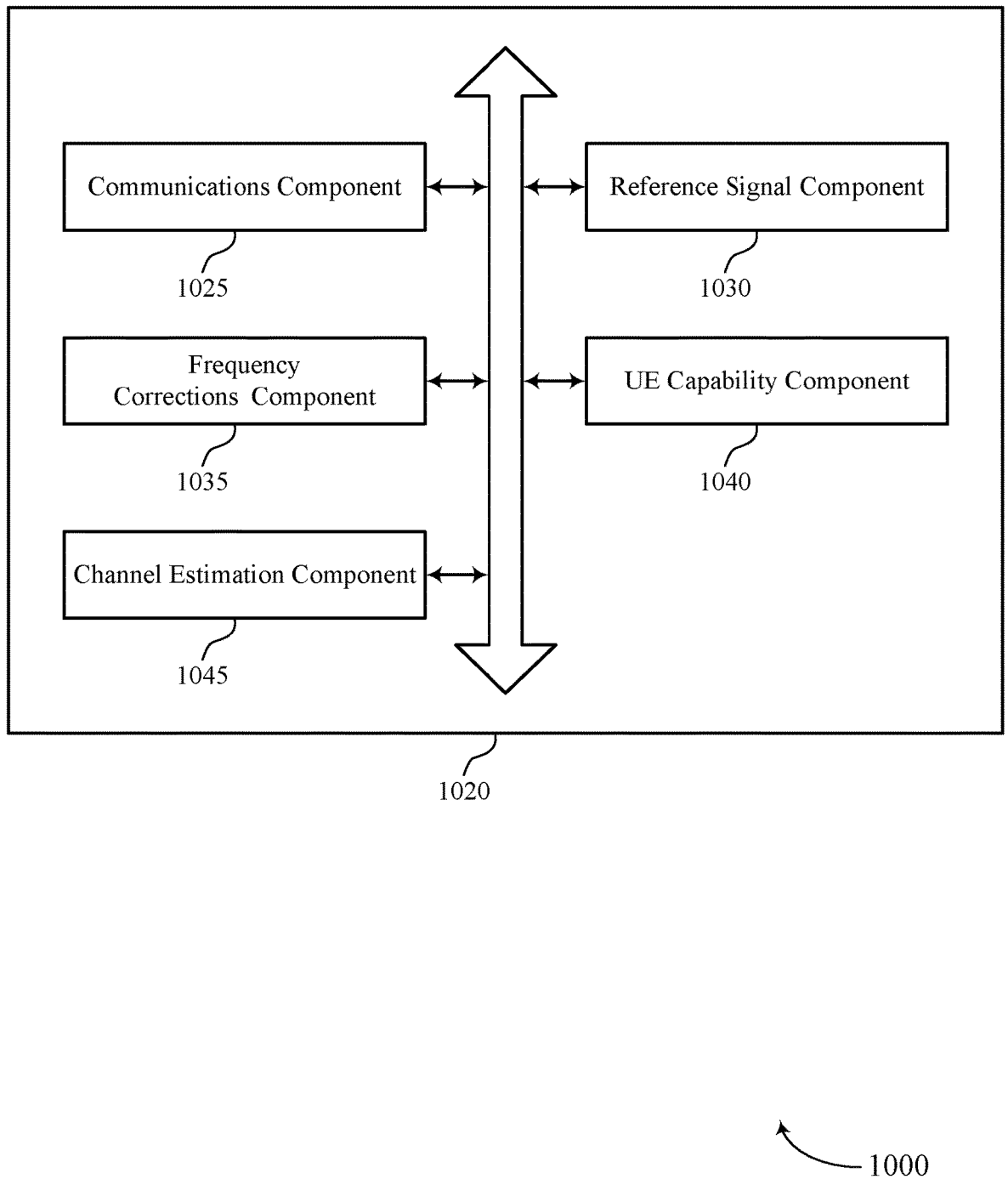
FIG. 10 illustrates a block diagram of a communications manager that supports techniques for reporting frequency corrections in accordance with one or more aspects of the present disclosure.

FIG. 10 illustrates a block diagram 1000 of a communications manager 1020 that supports techniques for reporting frequency corrections in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for reporting frequency corrections as described herein. For example, the communications manager 1020 may include a communications component 1025, a reference signal component 1030, a frequency corrections component 1035, a UE capability component 1040, a channel estimation component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The communications component 1025 may be configured as or otherwise support a means for transmitting, to a UE, a request to report one or more frequency corrections, the request including an indication of one or more reporting parameters for the one or more frequency corrections. The reference signal component 1030 may be configured as or otherwise support a means for transmitting a set of one or more reference signals associated with performing the one or more frequency corrections at the UE. The frequency corrections component 1035 may be configured as or otherwise support a means for receiving, from the UE, a report indicating the one or more frequency corrections in accordance with the one or more reporting parameters.

In some examples, the UE capability component 1040 may be configured as or otherwise support a means for receiving, from the UE, an indication of a UE capability to report the one or more frequency corrections, where transmitting the request to report the one or more frequency corrections is based on the indication of the UE capability.

In some examples, the reference signal component 1030 may be configured as or otherwise support a means for transmitting a second set of one or more reference signals after transmitting the set of one or more reference signals. In some examples, the frequency corrections component 1035 may be configured as or otherwise support a means for receiving, from the UE, a second report indicating the second set of frequency error corrections in accordance with the one or more reporting parameters and the second set of one or more reference signals.

In some examples, the channel estimation component 1045 may be configured as or otherwise support a means for performing a channel estimation for the UE based on the report indicating the one or more frequency corrections and the second report indicating the second set of frequency error corrections.

In some examples, the report and the second report are periodic reports.

In some examples, the one or more reporting parameters indicate a periodicity of transmitting the report indicating the one or more frequency corrections. In some examples, the report and the second report are aperiodic reports. In some examples, the one or more reporting parameters indicate a trigger for transmitting the report indicating the one or more frequency corrections.

In some examples, the trigger includes reception of the set of one or more reference signals at the UE. In some examples, the set of one or more reference signals includes at least one of a DMRS, a TRS, or a combination thereof.

Figure 11:
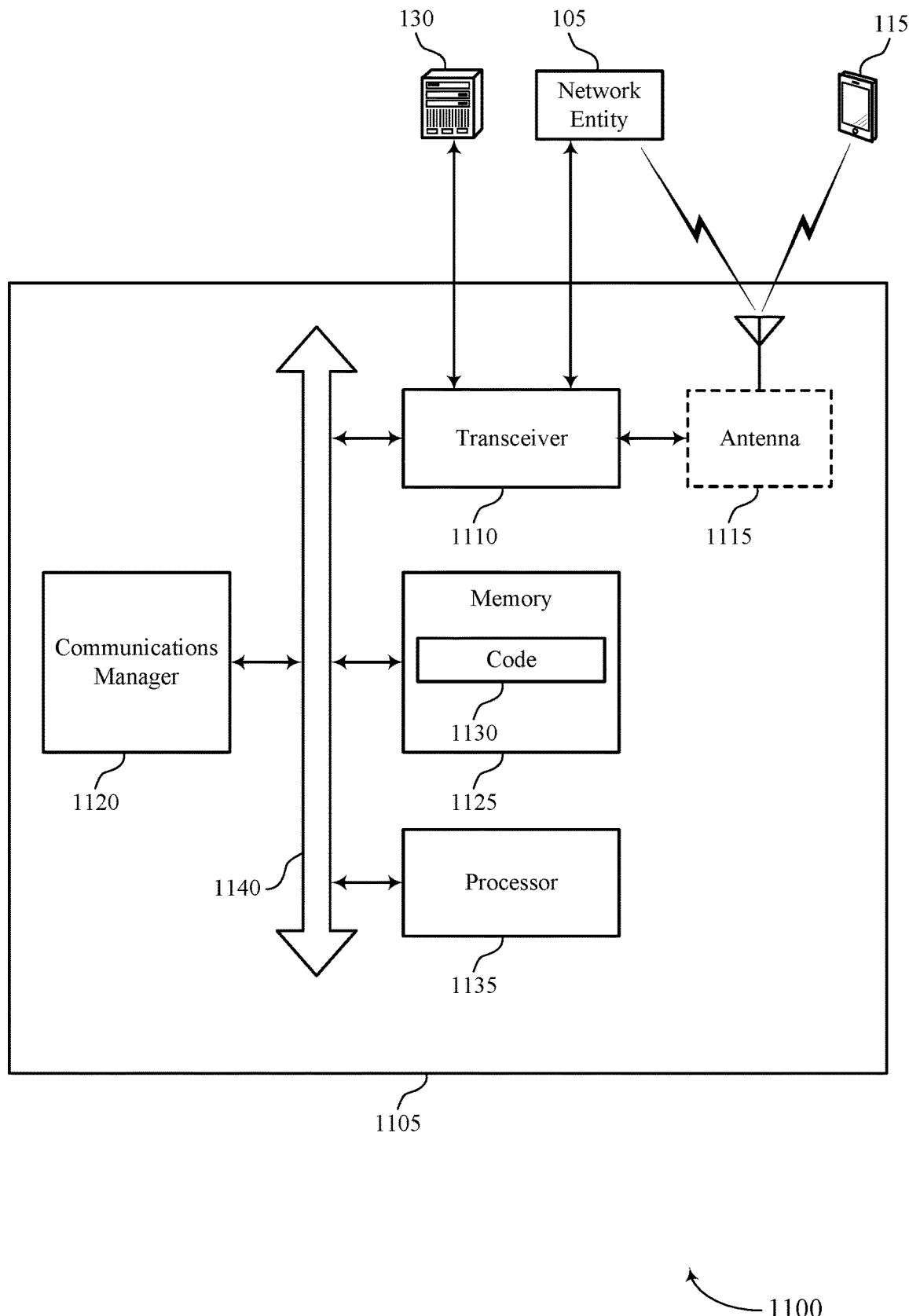
FIG. 11 illustrates a diagram of a system including a device that supports techniques for reporting frequency corrections in accordance with one or more aspects of the present disclosure.

FIG. 11 illustrates a diagram of a system 1100 including a device 1105 that supports techniques for reporting frequency corrections in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for reporting frequency corrections). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting, to a UE, a request to report one or more frequency corrections, the request including an indication of one or more reporting parameters for the one or more frequency corrections. The communications manager 1120 may be configured as or otherwise support a means for transmitting a set of one or more reference signals associated with performing the one or more frequency corrections at the UE. The communications manager 1120 may be configured as or otherwise support a means for receiving, from the UE, a report indicating the one or more frequency corrections in accordance with the one or more reporting parameters.

By including or configuring the communications manager 1120 in accordance with examples as described herein, the device 1105 may support techniques for a network entity to improve channel estimation accuracy, which may improve communication reliability, reduce latency and improve user experience.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of techniques for reporting frequency corrections as described herein, or the processor 1135 and the memory 1125 may be otherwise configured to perform or support such operations.

Figure 12:
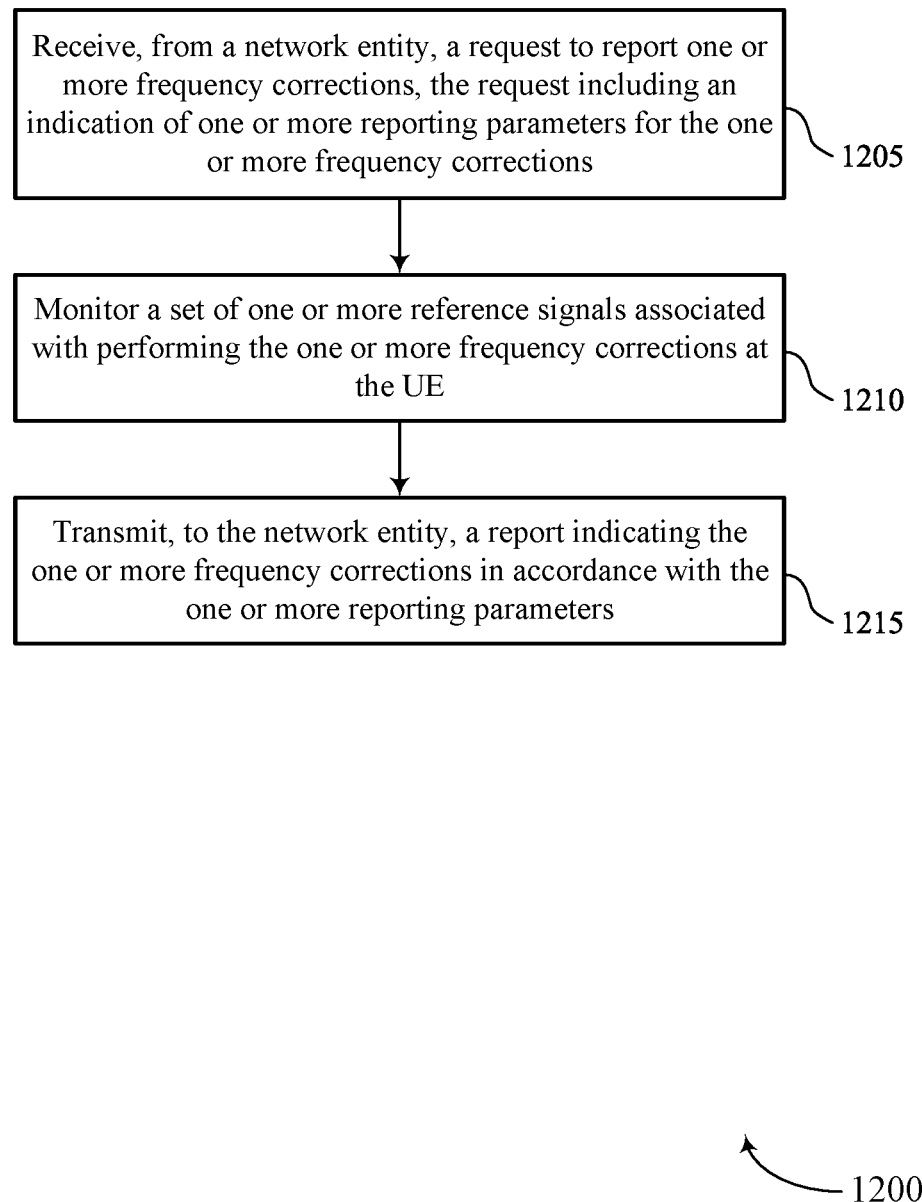
FIGS. 12 through 15 illustrate flowcharts showing methods that support techniques for reporting frequency corrections in accordance with one or more aspects of the present disclosure.

FIG. 12 illustrates a flowchart illustrating a method 1200 that supports techniques for reporting frequency corrections in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, a request to report one or more frequency corrections, the request including an indication of one or more reporting parameters for the one or more frequency corrections. The operations of 1205 may be performed in accordance with examples as disclosed herein. In some examples, aspects of the operations of 1205 may be performed by a communications component 625 as described with reference to FIG. 6.

At 1210, the method may include monitoring a set of one or more reference signals associated with performing the one or more frequency corrections at the UE. The operations of 1210 may be performed in accordance with examples as disclosed herein. In some examples, aspects of the operations of 1210 may be performed by a reference signal monitoring component 630 as described with reference to FIG. 6.

At 1215, the method may include transmitting, to the network entity, a report indicating the one or more frequency corrections in accordance with the one or more reporting parameters. The operations of 1215 may be performed in accordance with examples as disclosed herein. In some examples, aspects of the operations of 1215 may be performed by a frequency corrections component 635 as described with reference to FIG. 6.

Figure 13:
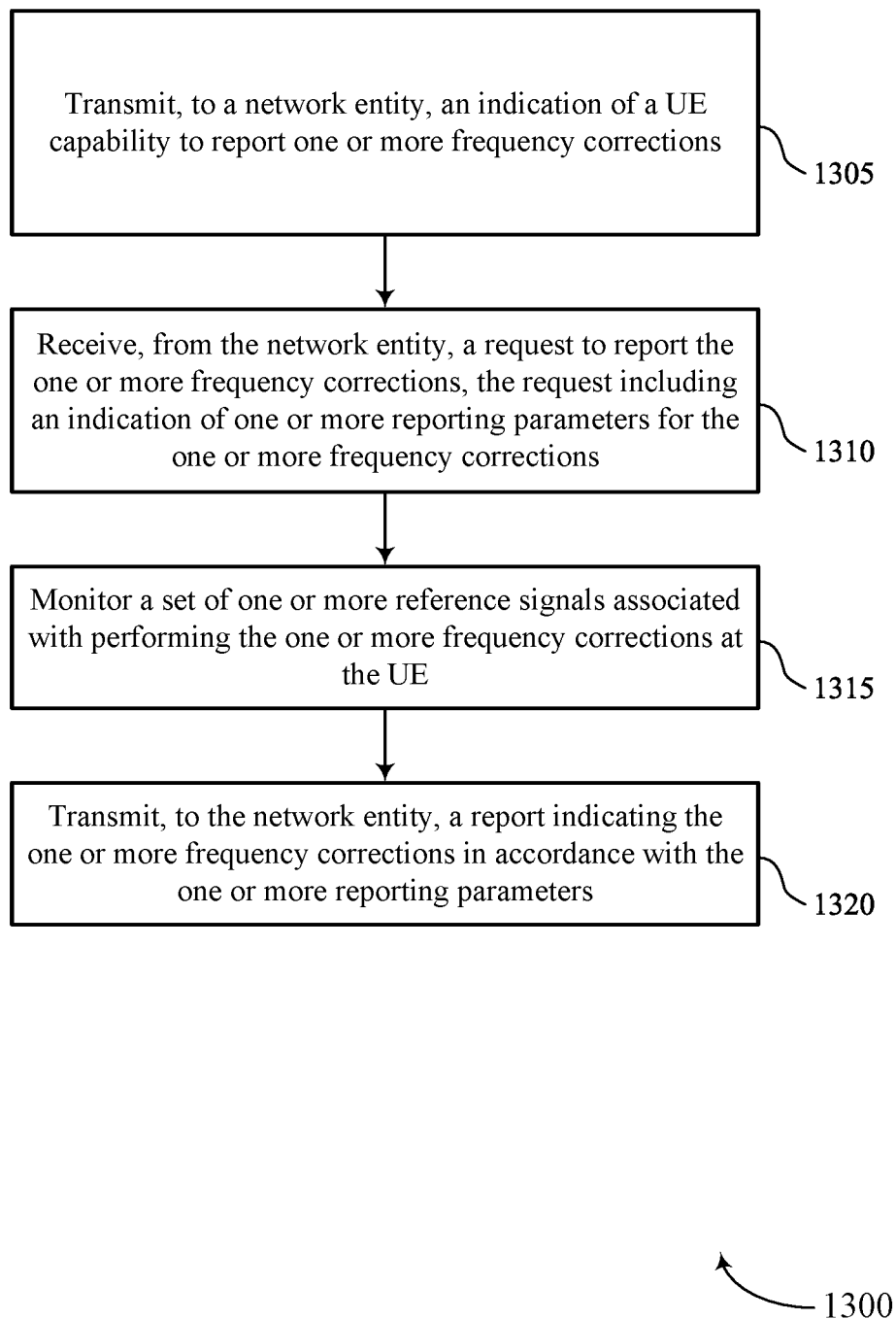

FIG. 13 illustrates a flowchart illustrating a method 1300 that supports techniques for reporting frequency corrections in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, to the network entity, an indication of a UE capability to report one or more frequency corrections. The operations of 1305 may be performed in accordance with examples as disclosed herein. In some examples, aspects of the operations of 1305 may be performed by a UE capability component 640 as described with reference to FIG. 6.

At 1310, the method may include receiving, from a network entity, a request to report the one or more frequency corrections, the request including an indication of one or more reporting parameters for the one or more frequency corrections. The operations of 1310 may be performed in accordance with examples as disclosed herein.

In some examples, aspects of the operations of 1310 may be performed by a communications component 625 as described with reference to FIG. 6.

At 1315, the method may include monitoring a set of one or more reference signals associated with performing the one or more frequency corrections at the UE. The operations of 1315 may be performed in accordance with examples as disclosed herein. In some examples, aspects of the operations of 1315 may be performed by a reference signal monitoring component 630 as described with reference to FIG. 6.

At 1320, the method may include transmitting, to the network entity, a report indicating the one or more frequency corrections in accordance with the one or more reporting parameters. The operations of 1320 may be performed in accordance with examples as disclosed herein. In some examples, aspects of the operations of 1320 may be performed by a frequency corrections component 635 as described with reference to FIG. 6.

Figure 14:
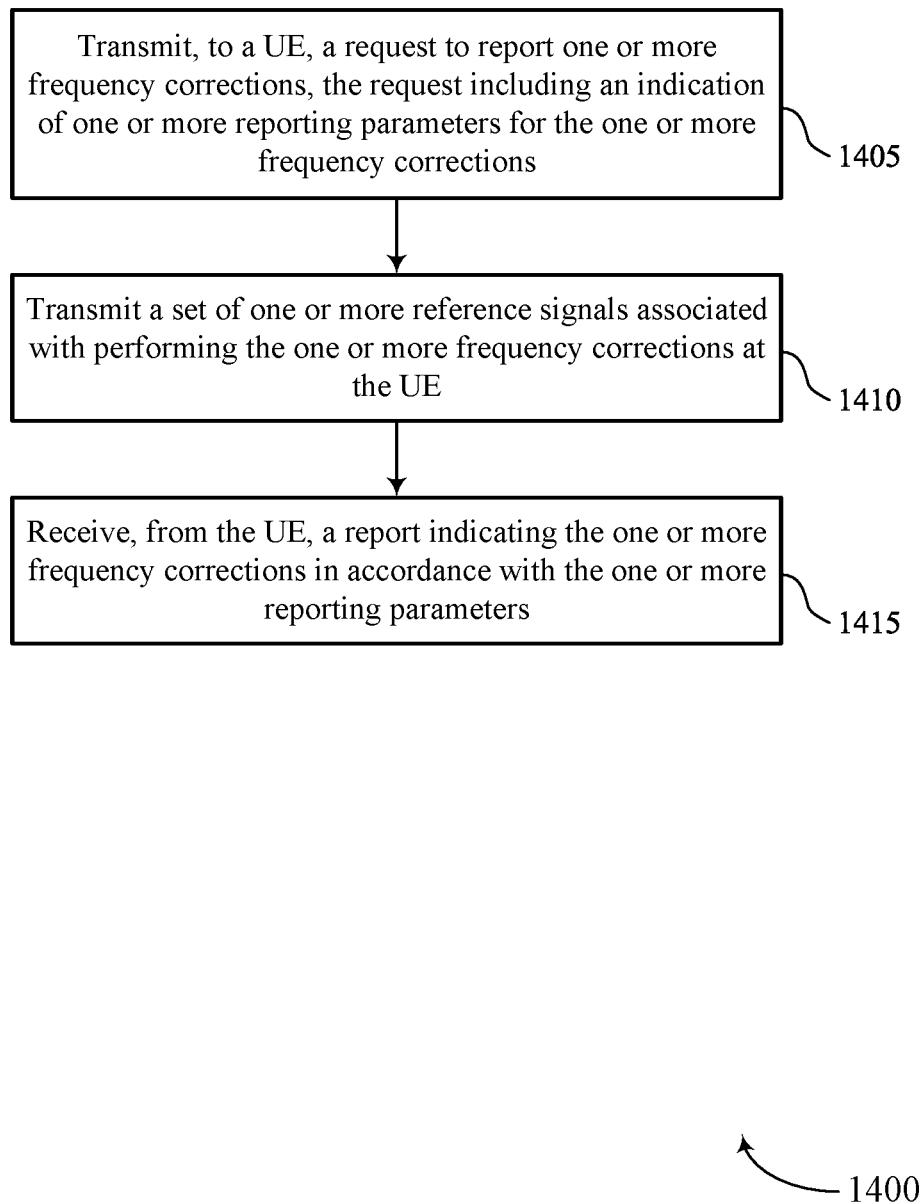

FIG. 14 illustrates a flowchart illustrating a method 1400 that supports techniques for reporting frequency corrections in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, a request to report one or more frequency corrections, the request including an indication of one or more reporting parameters for the one or more frequency corrections. The operations of 1405 may be performed in accordance with examples as disclosed herein. In some examples, aspects of the operations of 1405 may be performed by a communications component 1025 as described with reference to FIG. 10.

At 1410, the method may include transmitting a set of one or more reference signals associated with performing the one or more frequency corrections at the UE. The operations of 1410 may be performed in accordance with examples as disclosed herein. In some examples, aspects of the operations of 1410 may be performed by a reference signal component 1030 as described with reference to FIG. 10.

At 1415, the method may include receiving, from the UE, a report indicating the one or more frequency corrections in accordance with the one or more reporting parameters. The operations of 1415 may be performed in accordance with examples as disclosed herein. In some examples, aspects of the operations of 1415 may be performed by a frequency corrections component 1035 as described with reference to FIG. 10.

Figure 15:
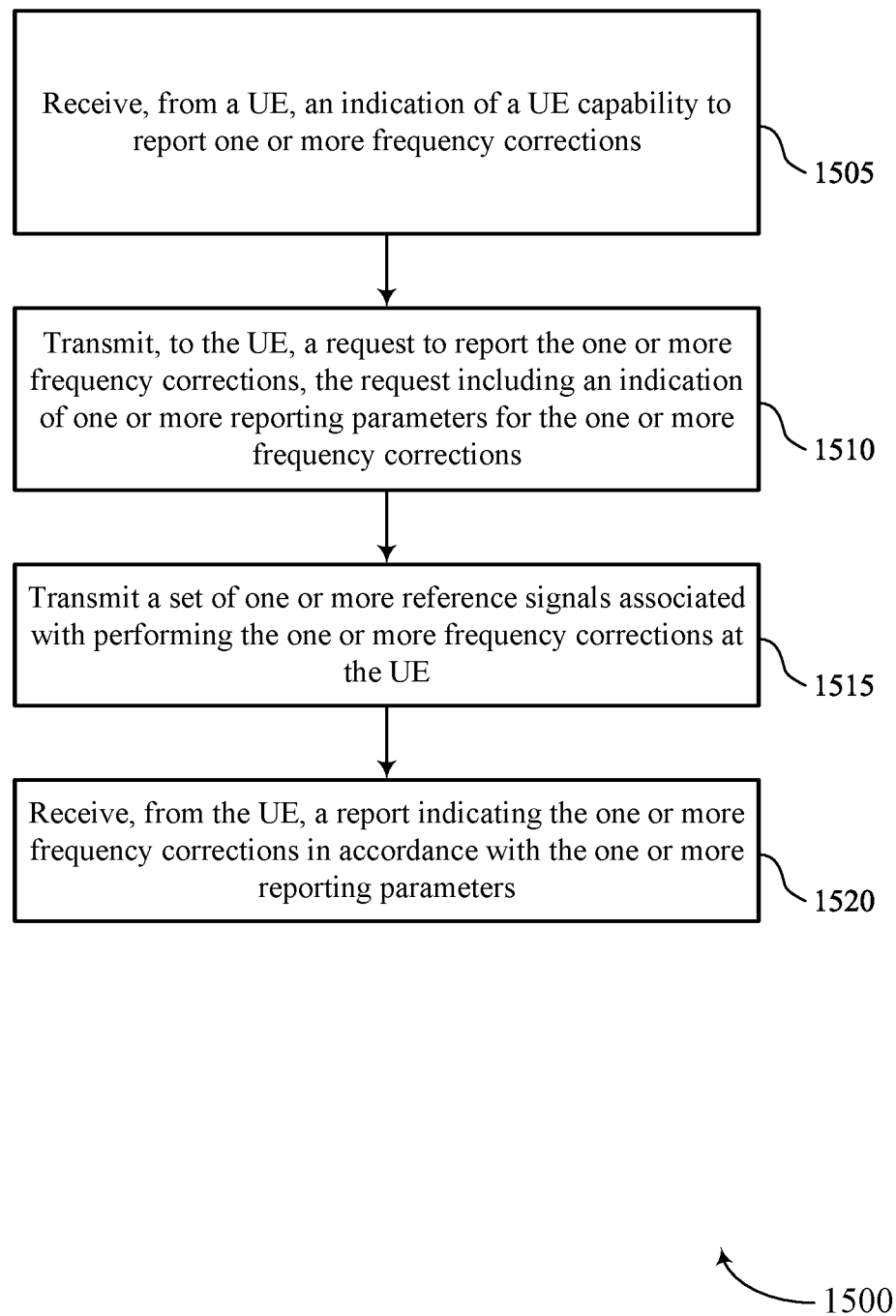

FIG. 15 illustrates a flowchart illustrating a method 1500 that supports techniques for reporting frequency corrections in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include receiving, from the UE, an indication of a UE capability to report one or more frequency corrections. The operations of 1505 may be performed in accordance with examples as disclosed herein. In some examples, aspects of the operations of 1505 may be performed by a UE capability component 1040 as described with reference to FIG. 10.

At 1510, the method may include transmitting, to a UE, a request to report the one or more frequency corrections, the request including an indication of one or more reporting parameters for the one or more frequency corrections. The operations of 1510 may be performed in accordance with examples as disclosed herein. In some examples, aspects of the operations of 1510 may be performed by a communications component 1025 as described with reference to FIG. 10.

At 1515, the method may include transmitting a set of one or more reference signals associated with performing the one or more frequency corrections at the UE. The operations of 1515 may be performed in accordance with examples as disclosed herein. In some examples, aspects of the operations of 1515 may be performed by a reference signal component 1030 as described with reference to FIG. 10.

At 1520, the method may include receiving, from the UE, a report indicating the one or more frequency corrections in accordance with the one or more reporting parameters. The operations of 1520 may be performed in accordance with examples as disclosed herein. In some examples, aspects of the operations of 1520 may be performed by a frequency corrections component 1035 as described with reference to FIG. 10.

The following provides an overview of aspects of the present disclosure:

Aspect 1: A method for wireless communication at a UE, comprising: receiving, from a network entity, a request to report one or more frequency corrections, the request comprising an indication of one or more reporting parameters for the one or more frequency corrections; monitoring a set of one or more reference signals associated with performing the one or more frequency corrections at the UE; and transmitting, to the network entity, a report indicating the one or more frequency corrections in accordance with the one or more reporting parameters.

Aspect 2: The method of aspect 1, further comprising: transmitting, to the network entity, an indication of a UE capability to report the one or more frequency corrections, wherein receiving the request to report the one or more frequency corrections is based at least in part on the indication of the UE capability.

Aspect 3: The method of any of aspects 1 through 2, further comprising: monitoring a second set of one or more reference signals after monitoring the set of one or more reference signals; transmitting, to the network entity, a second report indicating a second set of frequency error corrections in accordance with the one or more reporting parameters and the second set of one or more reference signals.

Aspect 4: The method of aspect 3, wherein the report and the second report are periodic reports.

Aspect 5: The method of aspect 4, wherein the one or more reporting parameters indicate a periodicity of transmitting the report indicating the one or more frequency corrections.

Aspect 6: The method of any of aspects 3, wherein the report and the second report are aperiodic reports.

Aspect 7: The method of any of aspects 1 through 6, wherein the one or more reporting parameters indicate a trigger for transmitting the report indicating the one or more frequency corrections.

Aspect 8: The method of aspect 7, wherein the trigger comprises reception of the set of one or more reference signals at the UE.

Aspect 9: The method of any of aspects 1 through 8, wherein the set of one or more reference signals comprises at least one of a DMRS, a TRS, or a combination thereof.

Aspect 10: A method for wireless communication at a network entity, comprising: transmitting, to a UE, a request to report one or more frequency corrections, the request comprising an indication of one or more reporting parameters for the one or more frequency corrections; transmitting a set of one or more reference signals associated with performing the one or more frequency corrections at the UE; and receiving, from the UE, a report indicating the one or more frequency corrections in accordance with the one or more reporting parameters.

Aspect 11: The method of aspect 10, further comprising: receiving, from the UE, an indication of a UE capability to report the one or more frequency corrections, wherein transmitting the request to report the one or more frequency corrections is based at least in part on the indication of the UE capability.

Aspect 12: The method of any of aspects 10 through 11, further comprising: transmitting a second set of one or more reference signals after transmitting the set of one or more reference signals; receiving, from the UE, a second report indicating the second set of frequency error corrections in accordance with the one or more reporting parameters and the second set of one or more reference signals.

Aspect 13: The method of aspect 12, further comprising: performing a channel estimation for the UE based at least in part on the report indicating the one or more frequency corrections and the second report indicating the second set of frequency error corrections.

Aspect 14: The method of any of aspects 12 through 13, wherein the report and the second report are periodic reports.

Aspect 15: The method of aspect 14, wherein the one or more reporting parameters indicate a periodicity of transmitting the report indicating the one or more frequency corrections.

Aspect 16: The method of any of aspects 12, wherein the report and the second report are aperiodic reports.

Aspect 17: The method of any of aspects 10 through 16, wherein the one or more reporting parameters indicate a trigger for transmitting the report indicating the one or more frequency corrections.

Aspect 18: The method of aspect 17, wherein the trigger comprises reception of the set of one or more reference signals at the UE.

Aspect 19: The method of any of aspects 10 through 18, wherein the set of one or more reference signals comprises at least one of a DMRS, a TRS, or a combination thereof.

Aspect 20: An apparatus for wireless communication at a UE, comprising a processor; memory coupled with the processor; and instructions stored in the memory and executable by the processor to cause the apparatus to perform a method of any of aspects 1 through 9.

Aspect 21: An apparatus for wireless communication at a UE, comprising at least one means for performing a method of any of aspects 1 through 9.

Aspect 22: A non-transitory computer-readable medium storing code for wireless communication at a UE, the code comprising instructions executable by a processor to perform a method of any of aspects 1 through 9.

Aspect 23: An apparatus for wireless communication at a network entity, comprising a processor; memory coupled with the processor; and instructions stored in the memory and executable by the processor to cause the apparatus to perform a method of any of aspects 10 through 19.

Aspect 24: An apparatus for wireless communication at a network entity, comprising at least one means for performing a method of any of aspects 10 through 19.

Aspect 25: A non-transitory computer-readable medium storing code for wireless communication at a network entity, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and operable to execute the code to cause the UE to:
receive, from a network entity, a request to report one or more frequency corrections, the request further comprising an indication of one or more reporting parameters that trigger the UE to transmit a report indicating the one or more frequency corrections performed at the UE during a channel estimation procedure;
monitor a set of one or more reference signals associated with performing the one or more frequency corrections at the UE during the channel estimation procedure;
transmit, to the network entity, the report indicating the one or more frequency corrections performed at the UE during the channel estimation procedure in accordance with the one or more reporting parameters;
monitor a second set of one or more reference signals after monitoring the set of one or more reference signals;
transmit, to the network entity, a second report indicating a second set of frequency error corrections in accordance with the one or more reporting parameters and the second set of one or more reference signals;
wherein the report and the second report are periodic reports; and
wherein the one or more reporting parameters indicate a periodicity of transmitting the report indicating the one or more frequency corrections.

2. The UE of claim 1, wherein the one or more processors are further operable to execute the code to cause the UE to:
transmit, to the network entity, an indication of a UE capability to report the one or more frequency corrections, wherein receiving the request to report the one or more frequency corrections is based at least in part on the indication of the UE capability.

3. The UE of claim 1, wherein:
the report and the second report are aperiodic reports.

4. The UE of claim 1, wherein the trigger comprises reception of the set of one or more reference signals at the UE.

5. The UE of claim 1, wherein the set of one or more reference signals comprises at least one of a demodulation reference signal, a tracking reference signal, or a combination thereof.

6. A network entity, comprising:
one or more memories storing processor-executable code; and
one or more processors coupled with the one or more memories and operable to execute the code to cause the network entity to:
transmit, to a user equipment (UE), a request to report one or more frequency corrections, the request further comprising an indication of one or more reporting parameters that trigger the UE to transmit a report indicating the one or more frequency corrections performed at the UE during a channel estimation procedure;
transmit a set of one or more reference signals associated with performing the one or more frequency corrections at the UE during the channel estimation procedure;
receive, from the UE, the report indicating the one or more frequency corrections performed at the UE during the channel estimation procedure in accordance with the one or more reporting parameters;
transmit a second set of one or more reference signals after transmitting the set of one or more reference signals;
receive, from the UE, a second report indicating a second set of frequency error corrections in accordance with the one or more reporting parameters and the second set of one or more reference signals;
wherein the report and the second report are periodic reports; and
wherein the one or more reporting parameters indicate a periodicity of transmitting the report indicating the one or more frequency corrections.

7. The network entity of claim 6, wherein the one or more processors are further operable to execute the code to cause the network entity to:
receive, from the UE, an indication of a UE capability to report the one or more frequency corrections, wherein transmitting the request to report the one or more frequency corrections is based at least in part on the indication of the UE capability.

8. The network entity of claim 6, wherein the one or more processors are further operable to execute the code to cause the network entity to:
perform a second channel estimation for the UE based at least in part on the report indicating the one or more frequency corrections and the second report indicating the second set of frequency error corrections.

9. The network entity of claim 6, wherein:
the report and the second report are aperiodic reports.

10. The network entity of claim 6, wherein the trigger comprises reception of the set of one or more reference signals at the UE.

11. The network entity of claim 6, wherein the set of one or more reference signals comprises at least one of a demodulation reference signal, a tracking reference signal, or a combination thereof.

12. A method for wireless communication at a user equipment (UE), comprising:
receiving, from a network entity, a request to report one or more frequency corrections, the request further comprising an indication of one or more reporting parameters that trigger the UE to transmit a report indicating the one or more frequency corrections performed at the UE during a channel estimation procedure;
monitoring a set of one or more reference signals associated with performing the one or more frequency corrections at the UE during the channel estimation procedure;
transmitting, to the network entity, the report indicating the one or more frequency corrections performed at the UE during the channel estimation procedure in accordance with the one or more reporting parameters;
monitoring a second set of one or more reference signals after monitoring the set of one or more reference signals;
transmitting, to the network entity, a second report indicating a second set of frequency error corrections in accordance with the one or more reporting parameters and the second set of one or more reference signals;
wherein the report and the second report are periodic reports; and wherein the one or more reporting parameters indicate a periodicity of transmitting the report indicating the one or more frequency corrections.

13. The method of claim 12, further comprising:
transmitting, to the network entity, an indication of a UE capability to report the one or more frequency corrections, wherein receiving the request to report the one or more frequency corrections is based at least in part on the indication of the UE capability.

14. The method of claim 12, wherein the report and the second report are aperiodic reports.

15. The method of claim 12, wherein the trigger comprises reception of the set of one or more reference signals at the UE.

16. The method of claim 12, wherein the set of one or more reference signals comprises at least one of a demodulation reference signal, a tracking reference signal, or a combination thereof.

17. A method for wireless communication at a network entity, comprising:
transmitting, to a user equipment (UE), a request to report one or more frequency corrections, the request further comprising an indication of one or more reporting parameters that trigger the UE to transmit a report indicating the one or more frequency corrections performed at the UE during a channel estimation procedure;
transmitting a set of one or more reference signals associated with performing the one or more frequency corrections at the UE during the channel estimation procedure;
receiving, from the UE, the report indicating the one or more frequency corrections performed at the UE during the channel estimation procedure in accordance with the one or more reporting parameters;
transmitting a second set of one or more reference signals after transmitting the set of one or more reference signals;
receiving, from the UE, a second report indicating a second set of frequency error corrections in accordance with the one or more reporting parameters and the second set of one or more reference signals;
wherein the report and the second report are periodic reports; and
wherein the one or more reporting parameters indicate a periodicity of transmitting the report indicating the one or more frequency corrections.

18. The method of claim 17, further comprising:
receiving, from the UE, an indication of a UE capability to report the one or more frequency corrections, wherein transmitting the request to report the one or more frequency corrections is based at least in part on the indication of the UE capability.

* * * * *